US006453014B1

(12) United States Patent
Jacobson et al.

(10) Patent No.: US 6,453,014 B1
(45) Date of Patent: Sep. 17, 2002

(54) TEST ACCESS AND PERFORMANCE MONITORING SYSTEM AND METHOD FOR CROSS-CONNECT COMMUNICATION NETWORK

(75) Inventors: Haim Jacobson, Tenafly; David Foni, Englewood, both of NJ (US); Marian Kramarczyk, Suffern, NY (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 09/219,810

(22) Filed: Dec. 23, 1998

Related U.S. Application Data

(60) Provisional application No. 60/081,485, filed on Apr. 13, 1998.

(51) Int. Cl.[7] .......................... H04M 1/24; H04M 3/08; H04M 3/22
(52) U.S. Cl. ................. 379/26.01; 379/27.01; 379/27.06; 379/27.07; 379/29.01
(58) Field of Search ................. 379/22, 22.05, 379/26.01, 27.01, 27.06–27.07, 29.01, 29.05, 32.02, 32.04

(56) References Cited

U.S. PATENT DOCUMENTS

| 4,663,776 A | 5/1987 | Wever et al. |
| 4,815,104 A | 3/1989 | Williams et al. |

(List continued on next page.)

FOREIGN PATENT DOCUMENTS

| DE | 3918144 | 12/1990 |
| EP | 317852 A2 | 5/1989 |
| EP | 383931 A1 | 8/1990 |
| EP | 687115 A2 A1 | 12/1995 |
| EP | 0 700 193 | 3/1996 |
| GB | 2236398 A | 4/1991 |
| WO | WO 98/03022 | 1/1998 |

OTHER PUBLICATIONS

"Network Surveillance Test and Reconfiguration (NetStar)® Remote Test Unit (RTU) User Manual," Hardware Description (TL1 Language) Installation Maintenance General Information, ADC Telecommunications, Inc., ADCP–66–301, 2nd Edition, Issue 1, Feb. 1991.

(List continued on next page.)

Primary Examiner—Duc Nguyen
(74) Attorney, Agent, or Firm—Fogg Slifer Polglaze Leffert & Jay P.A.

(57) ABSTRACT

A system and method for accessing a number of communication lines by one or more testing devices is disclosed. Each of the communications lines is coupled through the system and includes a first termination at a first telecommunications termination site and a second termination at a second telecommunications termination site. The system includes a number of line access devices, each of which is coupled to at least one of the communication lines terminating at the first telecommunications termination site and at least one of the communication lines terminating at the second telecommunications termination site. The system further includes a test device interface, signal direction circuitry, a communications device that facilitates remote access to the test access system by a remote processing unit, and a control device. The control device controls the signal direction circuitry to couple a selected communication line to a selected testing device coupled to the test device interface in response to a control signal received from the remote processing unit. The control device may also control the signal direction circuitry to couple a first selected line access device with a second selected line access device so as to establish a cross connection between the first and second selected line access devices. The test access system provides testing, monitoring, and cross connecting of high speed digital transmission lines, such as digital transmission lines characterized by transmission rates on the order of tens or hundreds of megabytes per second

44 Claims, 25 Drawing Sheets

U.S. PATENT DOCUMENTS

| | | | |
|---|---|---|---|
| 4,840,568 A | | 6/1989 | Burroughs et al. |
| 4,845,736 A | * | 7/1989 | Posner et al. |
| 4,901,004 A | | 2/1990 | King |
| 4,916,444 A | | 4/1990 | King |
| 4,968,929 A | | 11/1990 | Hauck et al. |
| 4,998,240 A | | 3/1991 | Williams |
| 5,052,940 A | | 10/1991 | Bengal |
| 5,107,532 A | | 4/1992 | Hansen et al. |
| 5,161,988 A | | 11/1992 | Krupka |
| 5,166,970 A | | 11/1992 | Ward |
| 5,195,902 A | | 3/1993 | Bengal |
| 5,325,361 A | | 6/1994 | Lederer et al. |
| 5,343,461 A | | 8/1994 | Barton et al. |
| 5,394,503 A | | 2/1995 | Dietz, Jr. et al. |
| 5,432,847 A | | 7/1995 | Hill et al. |
| 5,483,467 A | | 1/1996 | Krupka et al. |
| 5,523,747 A | | 6/1996 | Wise |
| 5,546,282 A | | 8/1996 | Hill et al. |
| 5,594,347 A | | 1/1997 | Louwagie et al. |
| 5,715,474 A | | 2/1998 | Burke et al. |
| 5,761,272 A | * | 6/1998 | Williams et al. |
| 5,920,608 A | * | 7/1999 | Minegishi |
| 5,933,475 A | * | 8/1999 | Coleman |

OTHER PUBLICATIONS

Brochure, Access Systems DS1/DS3, Series 2004/2005, Hadax Electronics, Inc., South Hackensack, NJ (1996).

Brochure, Access Systems DS1, Series 2004, Hadax Electronics, Inc., South Hackensack, NJ (1997).

Brochure, Access Systems DS3, Series 2005, Hadax Electronics, Inc., South Hackensack, NJ (1997).

American National Standard for Telecommunications– Digital Hierarchy– Layer 1 In–Service Digital Transmission Performance Monitoring, American National Standards Institute, Inc., New York, approxed Sep. 16, 1993.

http://www.adc.com/hadax/news/ds3,htm, XP002100334, "Hadax Electronics DS3 Access System Provides Immediate Problem Determination For DS3 Circuits", *Hadax In The News Press Releases 'Online*, 1 p. (Apr. 1999).

* cited by examiner

Fig. 4A

| Monitoring Bus | T-1 Line Access Cards | T-1 Ports |
|---|---|---|
| MB1 | 1 - 5 | 1 - 30 |
| MB2 | 6 - 10 | 31 - 60 |
| MB3 | 11 - 15 | 61 - 90 |

Fig. 4B

| PIN # | SIGNAL |
|---|---|
| 1 | TXB- |
| 2 | TXB+ |
| 3 | RXB- |
| 4 | RXB+ |
| 5 | RXA- |
| 6 | RXA+ |
| 7 | TXA- |
| 8 | TXA+ |
| 9 | TRACER LAMP |

Fig. 4C

| Mode | K1, K2 | K3, K5 | K4, K6 | K7 | K8 | K9 | K10 | K11, K13 | K12, K14 | K15 | K16 | K17 | K18 |
|---|---|---|---|---|---|---|---|---|---|---|---|---|---|
| Transparent | C | O | O | * | * | * | * | * | * | * | * | * | * |
| Mon EF | C | C | C | C | O | C | O | N | * | O | O | O | O |
| Mon EFX | C | C | C | C | C | C | O | X | * | O | O | O | O |
| Split EF | O | C | C | C | C | C | C | N | N | O | O | O | O |
| Split EFX | O | C | C | C | C | C | C | X | X | O | O | O | O |
| Split AB | O | C | C | C | C | C | C | N | X | O | C | O | O |
| Split ABX | O | C | C | O | O | O | O | X | N | C | * | O | O |
| Test Loopback | * | * | * | * | * | * | * | * | * | * | * | * | * |
| T-1 Loopback | O | O | O | O | O | O | O | * | * | C | C | C | C |

C - Closed
O - Open
N - Normal
x - Cross
* - Don't care

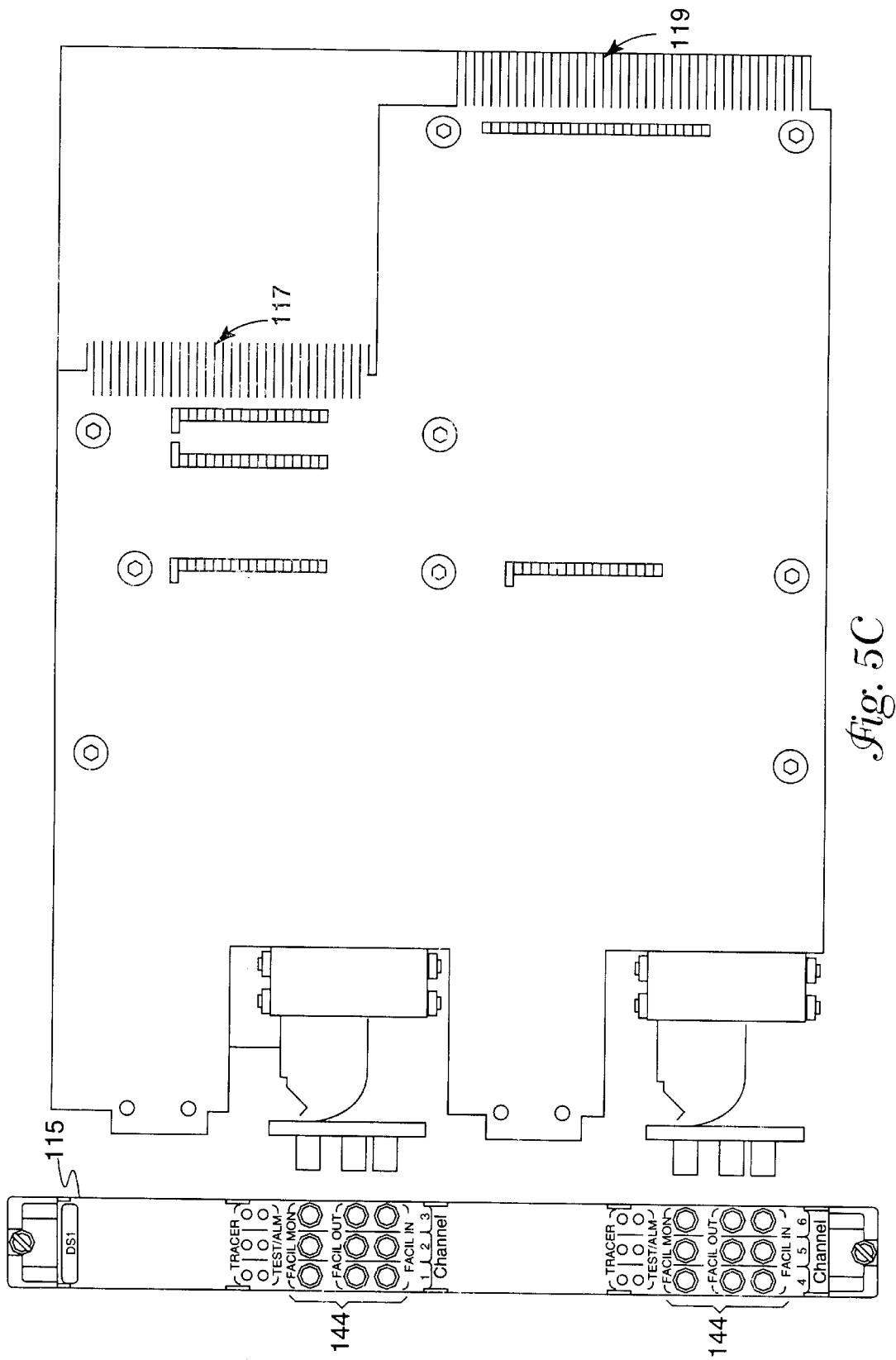

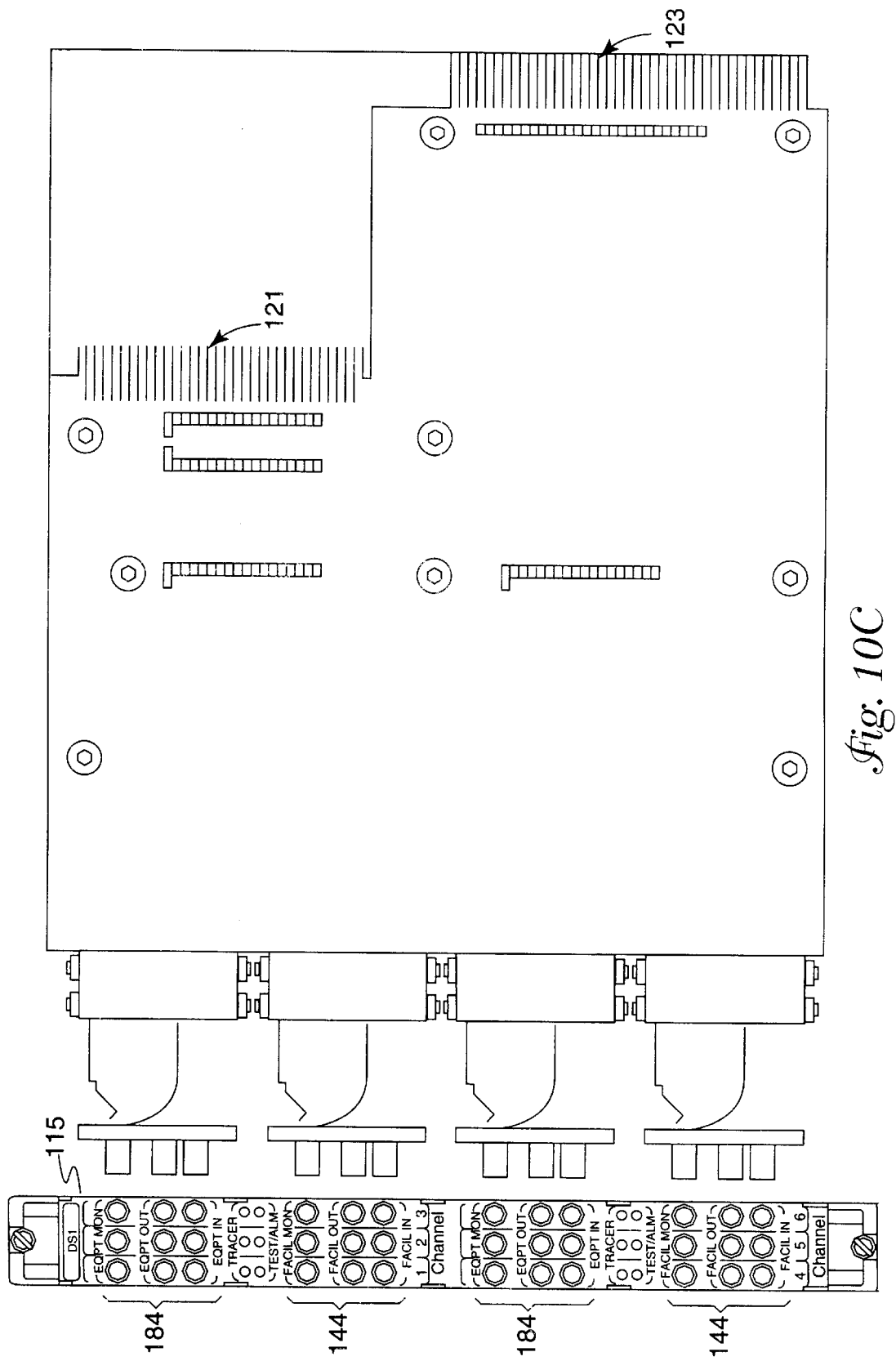

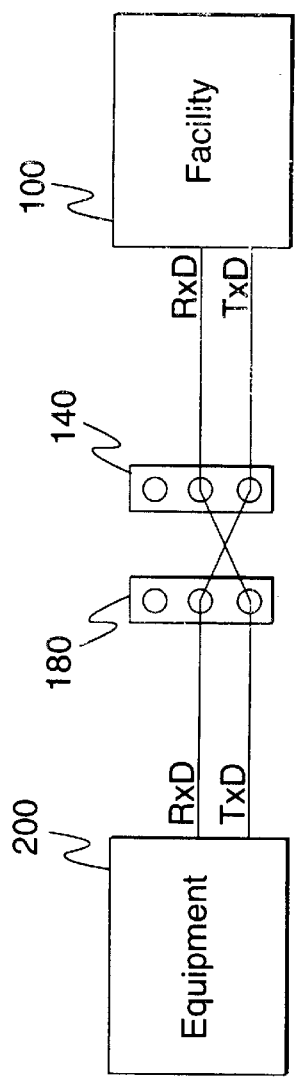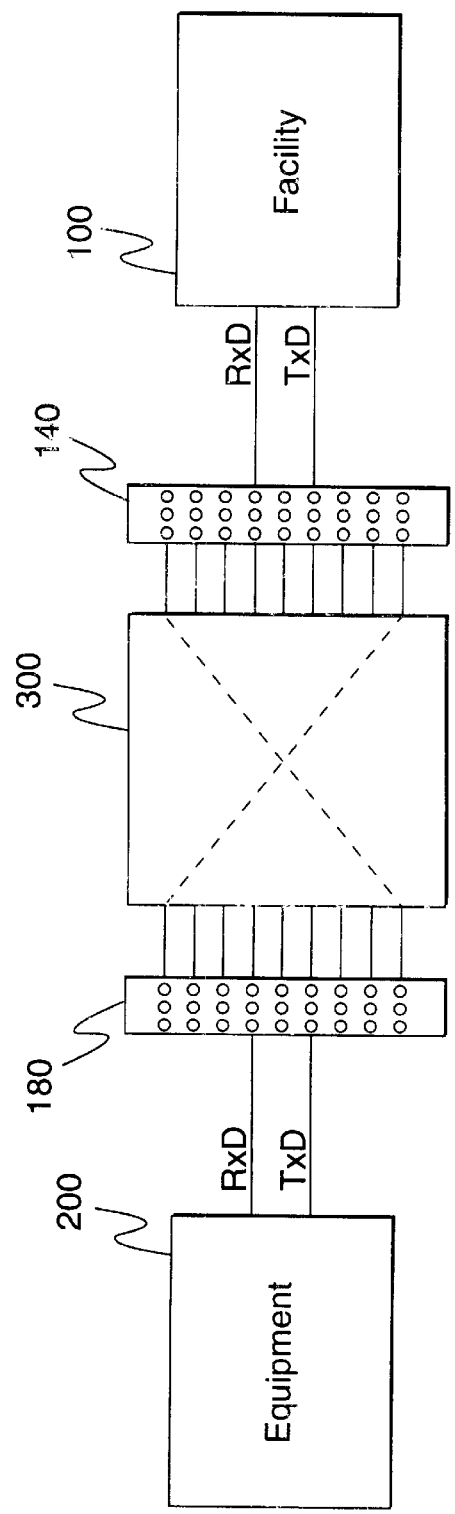
Fig. 11A Prior Art
Fig. 11B Prior Art

TEST ACCESS AND PERFORMANCE MONITORING SYSTEM AND METHOD FOR CROSS-CONNECT COMMUNICATION NETWORK

RELATED APPLICATIONS

This application claims the benefit of U.S. Provisional Application No. 60/081,485, filed Apr. 13, 1998.

FIELD OF THE INVENTION

The present invention relates generally to communication line testing systems and, more specifically, relates to a system having remote access which provides for selective access to, and connection between, testing equipment and any number of communication lines, and which further provides for performance monitoring of selected communication lines.

BACKGROUND OF THE INVENTION

Digital signal and cross-connect systems for use in telecommunications and, in particular, use of high speed T1, T2, T3, and T4 digital signaling systems is well known. Digital signal cross-connect (DSX) systems provide both permanent and temporary connections and cross-connections for customer premises applications, central offices, and remote sites. A typical configuration of such a digital cross-connect system is shown in FIG. 11A. FIG. 11A shows a configuration of a digital cross-connect system which provides crossconnect and patch capabilities.

A first patch panel 180 is connected to T1 lines, RXD and TXD for T1 signal transmission and reception, at equipment/ network location 200. Such equipment may be situated at a source provider (e.g. AT&T) location. A second patch panel 140 is connected to T1 lines, RXD and TXD for T1 signal transmission and reception, at facility location 100. The combination of patch panels 180 and 140 permit signal cross connections from/to the equipment side 200 to/from the facility side 100, respectively. Typically, a test device 300 is located between the patch panels for accessing, monitoring, and testing T1–T4 lines, as is shown in FIG. 11B. Each of the patch panels 180, 140 is externally coupled to the test device 300 through a series of connections (e.g., wire wrap, BNC, etc.), which permits physical access to the T1–T4 transmission lines at the particular patch panel cabinet. However, a number of problems exist with this configuration.

First, the system of FIG. 11B, where patch panels are externally connected to the test device, results in an exceedingly bulky configuration inappropriate for areas where space is at a premium. Second, each patch panel connection must be individually coupled via wire wrapping or through other coupling means (e.g., BNC) to the corresponding test device connection. Such connections are labor intensive and thus quite costly. In addition, testing at the location of the patch panel requires breaking of the communication line connection so that a technician, who must be physically on site at the patch panel, can perform diagnostic testing and evaluation.

Still further, patch panel 180 is generally owned/ controlled by the owner of equipment 200. In contrast, patch panel 140 is generally owned by the customer and located at the facility side location 100. Thus, any test access monitoring performed occurs at either the equipment location 200 or at the facility location 100, independently for each of the two patch panels 180 and 140. Consequently, any testing that occurs often requires duplicate testing and insertion of test devices at terminations on both sides of patch panels 180 and 140. This also causes duplication of wire-wrap connections, as well as duplication in terms of performance monitoring and alarm conditions. Consequently, a test system operable to include at least one of the patch panels within its testing apparatus for easing the performance testing and monitoring of high speed digital communication lines without requiring breaking of a circuit connection is highly desirable.

SUMMARY OF THE INVENTION

It is an object of the present invention to provide a test access system which permits access to, and configuration of, communication lines and test lines for monitoring and testing such lines. It is a further object of the present invention to provide a patching capability that permits a user to manually and directly access communication lines and test lines. A system and method implemented in accordance with the principles of the present invention provides for a reduction in the number of wire wrap connections to the communication lines, while providing full cross-connect and patching capabilities. The system further includes tracer features and performance monitoring for identifying and evaluating cross-connections among communication line circuits, such as T1 circuits, and is operable to connect test devices using the communication lines, and to establish communication links with a remote managing processor. This permits access monitoring and testing of communication lines while minimizing the need to dispatch technicians to a particular site. The system includes means for monitoring the communication lines, switching of test devices among communication lines, and controlling various operational modes associated with the system.

BRIEF DESCRIPTION OF THE DRAWINGS

FIG. 4A illustrates an association between communication line access cards, communication line ports, and monitoring busses in accordance with an embodiment of the present invention.

FIG. 4B shows the pin out configuration for 9 pin wire wrap connectors used for coupling to the motherboard of a test access system in accordance with an embodiment of the present invention.

FIG. 4C illustrates a relationship of line access card and test equipment card relays associated with each operational mode in a test access system according to an embodiment of the present invention.

FIGS. 5A–C show a block diagram, front view, and terminal layout, respectively, of a communication line access card incorporating a single patch in accordance with an embodiment of the present invention.

FIGS. 10A–C show a block diagram, front view, and terminal layout, respectively, of a communication line access card incorporating dual patch panels according to another embodiment of the present invention.

FIG. 11A illustrates a typical configuration of a digital cross-connect system and patch panel.

FIG. 11B illustrates a typical configuration of a test device externally connected to a patch panel.

DETAILED DESCRIPTION OF THE INVENTION

Figure 1:
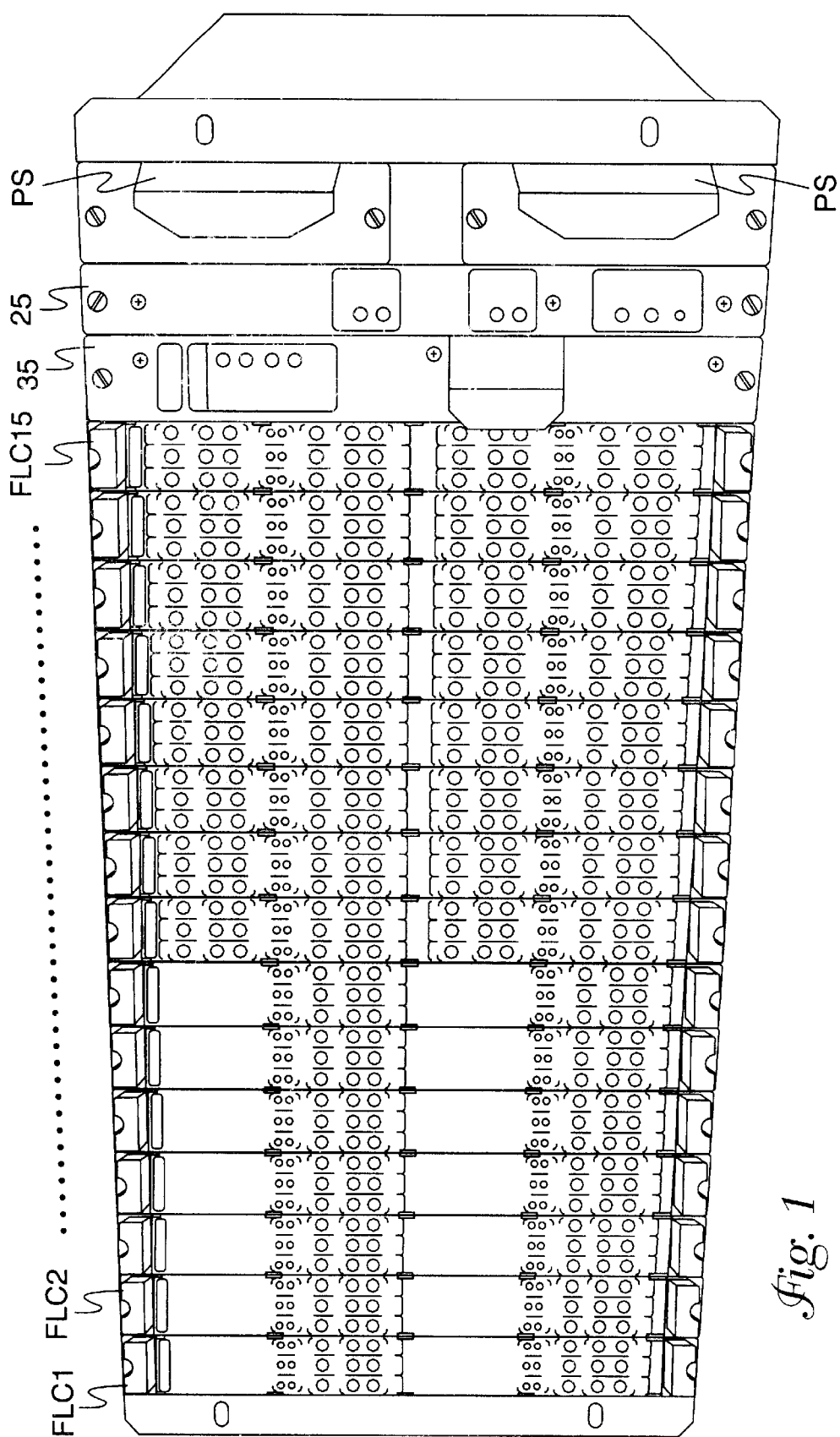
FIG. 1 is a front perspective view of a test access system in accordance with an embodiment of the present invention.
Figure 2:
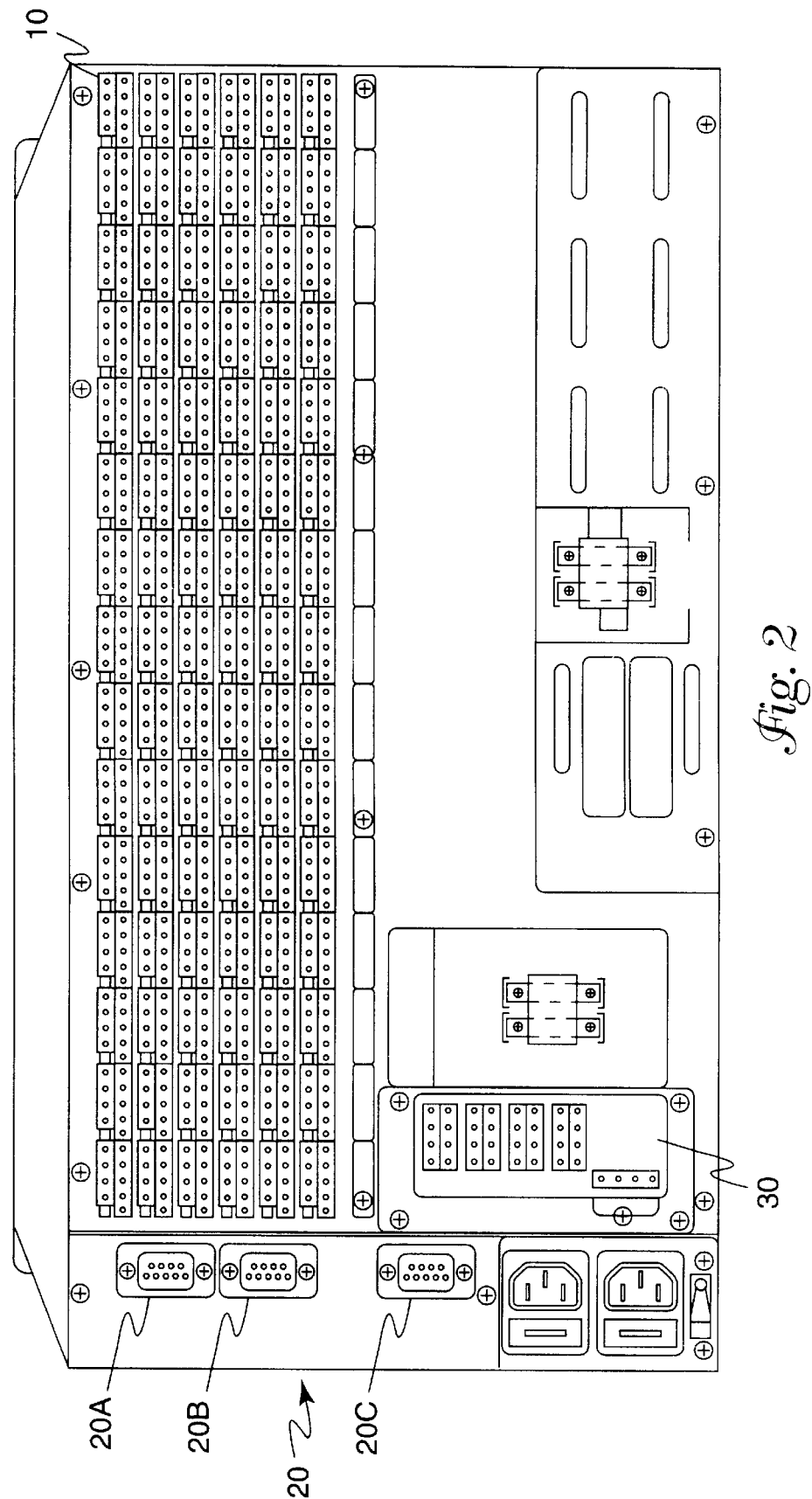
FIG. 2 is a rear perspective view of a test access system in accordance with an embodiment of the present invention.

Referring now to FIGS. 1 and 2, there are shown front and rear perspective views respectively of a test access system 8 embodying objects and features of the present invention. A commercially available system 8 embodying objects and features of the present invention is manufactured by ADC-Hadax, Inc. of South Hackensack, N.J. and is identified as the "2004 T-1 Access System." Objects and features of the present invention will generally be described within the context of a telecommunications network conforming to a T1 transmission carrier standard, which is used extensively in North America. Although the embodiments described herein generally refer to a test access system incorporating at least one patch and operable for monitoring, testing, and cross connecting communication transmission lines within the context of the T1 standard, it is understood that the systems and methods of the present invention are applicable for accessing, testing, and performance monitoring of other types of transmission lines, including T2–T4 transmission lines for example.

As is best seen in FIGS. 1 and 2, and in accordance with a preferred embodiment of the present invention, the test access system 8 may be configured to be rack mountable. The front of test access unit 8, as is shown in FIG. 1, includes fifteen line access cards 15 (LAC1–LAC15), a single test equipment card 35, a control card 25, which includes a programmable processor or CPU, and a pair of power supplies, 28 and 29. Each of the cards 15, 35, 25 is insertable into one of the 17 slots of modular chassis 27. The rear of the test access system 8, as is shown in FIG. 2, includes a bank of line access ports (LAP) 10 for connecting communication lines to the system 8, communication ports 20 A-C, and test equipment ports 30 (TP1–TP4).

As is shown in FIG. 1, the first seven line access cards 15 (LAC1–LAC7) provide for a single patch capability, as will be described later, while the remaining eight line access cards 15 (LAC8–LAC15) incorporate dual patch functionality. It is noted that each of the line access cards 15 are hot-swappable, such that, if one line access card 15 is removed, all communication signal connections are maintained. This advantageous feature permits one to change line access cards 15 without interrupting the flow of data over the communication lines. It is further noted that the types and quantities of line access cards 15 (i.e. single or dual patch, and the numbers corresponding to each) incorporated into a single test access unit 8 may be varied depending on the particular application and requirements of the system.

Figure 3:
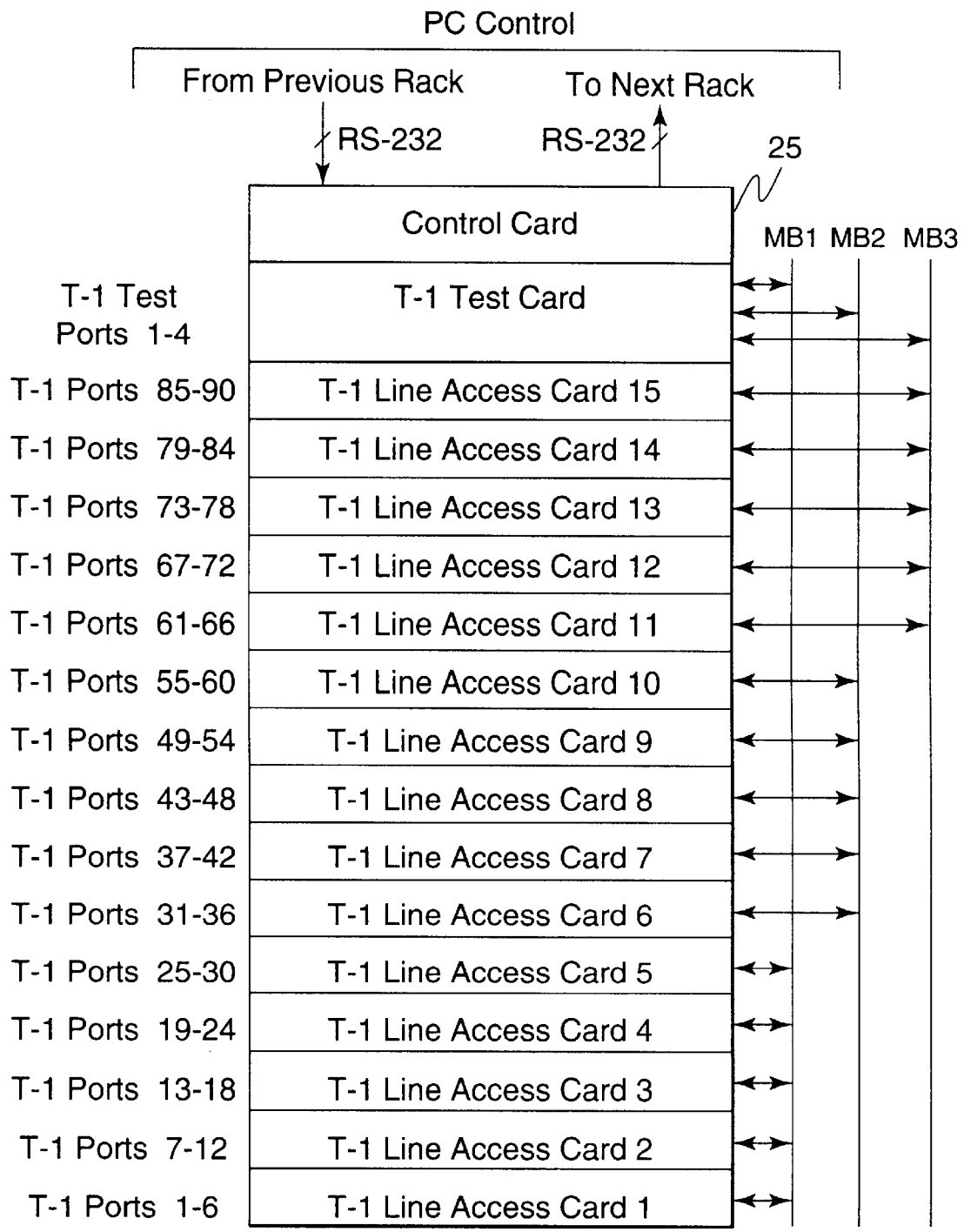
FIG. 3 is a block diagram of a test access system in accordance with an embodiment of the present invention.

Referring now to FIG. 3, and with continued reference to FIGS. 1 and 2, there is shown a block diagram of the test access system 8 in accordance with an embodiment of the present invention. As is shown in FIG. 3, each of the line access cards 15 can support up to 6 communication line ports to which the two sides of 6 full duplex communication line circuits may be connected. As such, up to 90 communication line circuits may be routed through a single test access system 8. As is further shown in FIG. 3, test equipment card 35 can supports up to four test ports, to which four test devices may be connected. Both the test equipment card 35 and the line access cards 15 are respectively controlled by the microprocessor-based control card 25.

Figure 12A:
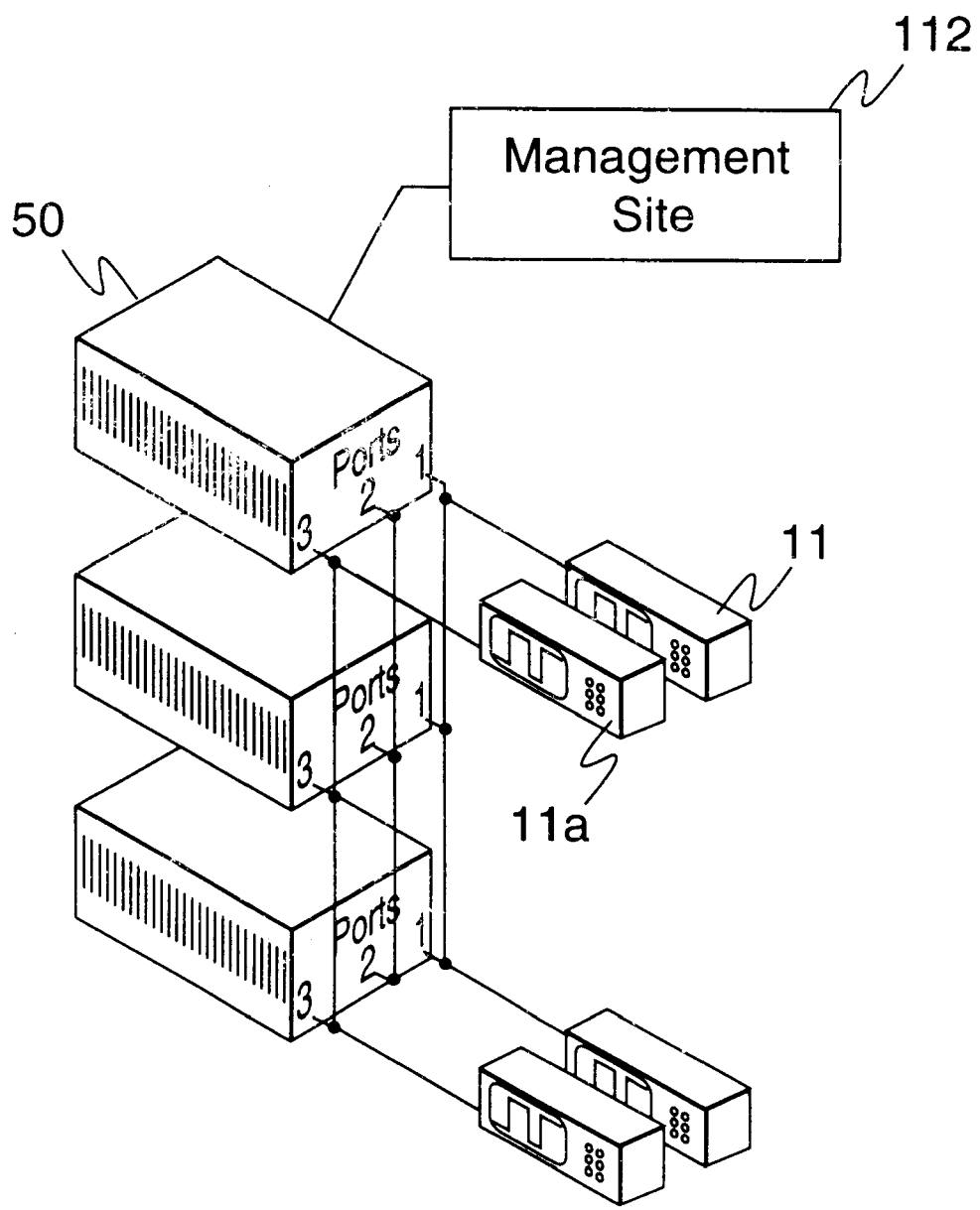
FIGS. 12A–B illustrate an interconnection of test devices to a test access system in accordance with an embodiment of the present invention.
Figure 12B:
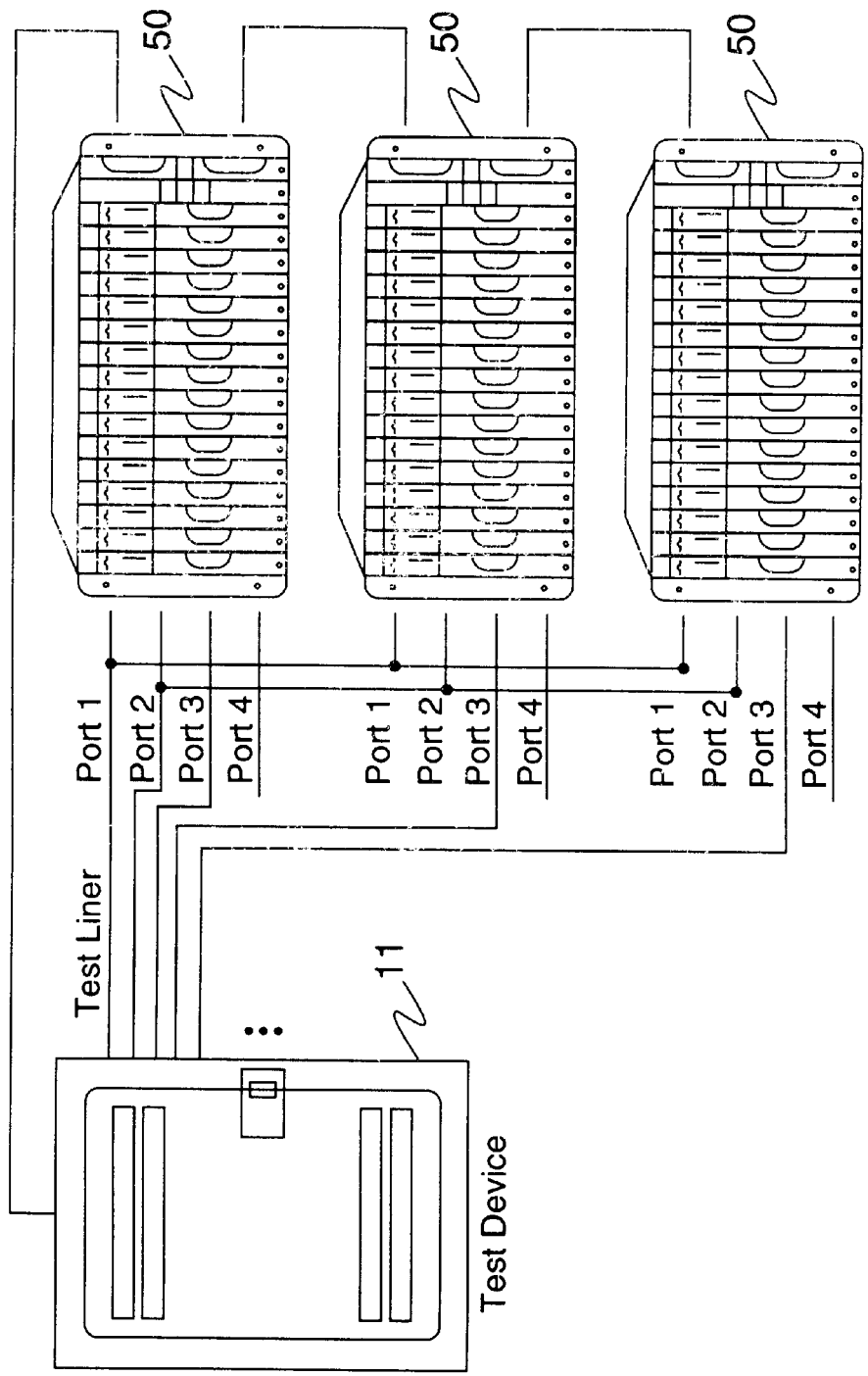

FIGS. 12A and 12B illustrate two of a variety of applications for connecting test devices to a test access system 8 of the present invention. As is shown in FIG. 12A, two connection lines may be established, namely, a test line 1 established between a test device 11 and a test access system 50, and a communication line 2 established between a test access system 50 and a management site 12. The test line 1 enables the flow of signals between communication lines connected to the test access systems 50 and the test device 11. The communication line 2 enables the flow of control signals between the test device 11 and the management site 12. As one can ascertain from FIG. 12A, a number of test devices 11, 11a may be shared among several test access systems 50. That is, each test device 11, 11a may be connected to more than one test access system 50. This is known as "bridging" the test devices 11, 11a. For example, and as is depicted in FIG. 12A, test device 11a is bridged with Unit 1 on test equipment port 3, with Unit 2 on test equipment port 3, and with Unit 3 on test equipment port 3. Such a configuration enables a test device 11, 11a to access a communication line connected to any of the connected test access systems 50. FIG. 12B shows a similar configuration of three modular test access systems 50 connecting to a test device 11.

Figure 13:
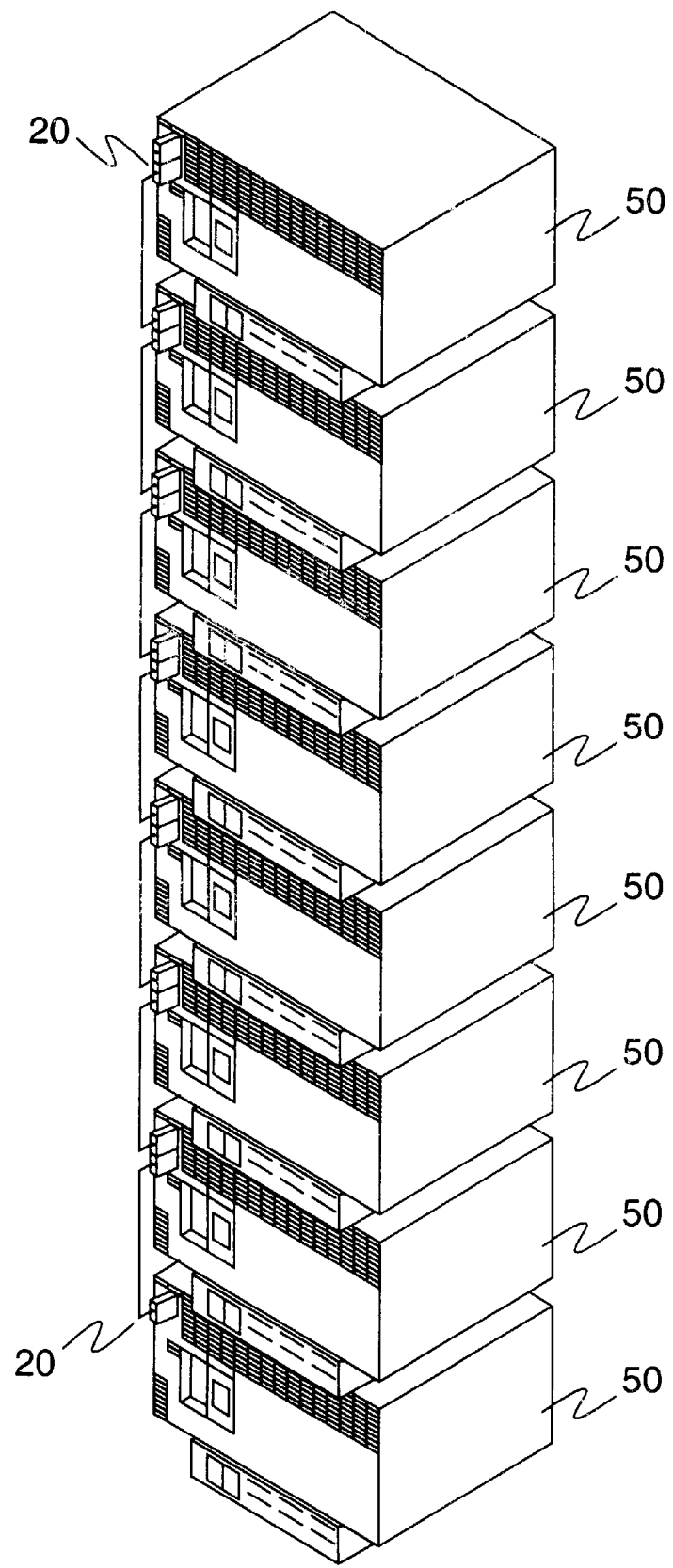
FIG. 13 illustrates a series of test access system units serially coupled to one another in accordance with an embodiment of the present invention.

FIG. 13 shows a number of test access units 50 serially connected to other corresponding test access units 50 via their communication ports 20. Such a setup allows a management device to communicate with a number of test access units 50 through only one line. Such a feature is advantageous at sites having limited availability to a network. That is, several daisy chained test access units 50 at any one site may communicate with the remote management device using only one modem. Each of the test access units 50 may be configured by use of a unique unit address, stable using DIP switches on the control card 25, to provide the management device with the identity of the test access unit 50 with which it is communicating. Thus, the test access units 50 connect with each other through their respective communication ports 20. Connecting control lines to these ports 20 provide for communication among these test access units 50, as well as with the system management device, such as a PCS. Preferably, a maximum of eight such test access units 50 may be daisy chained together.

Referring again to FIG. 3, the control card 25 receives configuration commands from a controlling device, such as a terminal or personal computer via an RS-232 link or LAN connection provided through the communication ports 20. The control card 25 may also provide outgoing information through one of its communication ports 20, such as status information provided by the control card 25. The use of the communication links make it particularly efficient to perform remote testing.

The test equipment card 35 and line access cards 15 are internally connected via three monitoring busses, MB1, MB2, and MB3, provided via a motherboard. In a preferred embodiment, the motherboard also contains 9-pin wire-wrap connectors which provide external connections to the communication line circuits at the rear of the rack mount. The test equipment ports 30, shown in FIG. 2, provides access to the test devices.

The test equipment card 35 provides test device access to three monitoring busses, MB1, MB2, and MB3, simultaneously. Any three of the four test ports, TP1–TP4, provided on test equipment card 35, can be connected to any of the three monitoring busses via a multiplexer (not shown). Each monitoring bus is assigned to a group of five line access cards 15, as is shown in FIG. 4A. Only one port from a line access card 15 belonging to a certain monitoring bus can be connected to that bus. Up to three ports, each one belonging to different monitoring busses, can be simultaneously connected to three of the test equipment ports 30 on the test equipment card 35.

Preferably, the motherboard includes 90 9-pin wire-wrap connectors. Eight of the pins of the wire-wrap connectors are used for connecting the communication line circuits. The 9th pin of each wire-wrap connector is used to connect a tracer lamp. The tracer lamps, in the preferred embodiment, are light emitting diodes (LEDs) which are used to indicate the connectivity status of a given communication line from a first termination (such as a first patch panel at the facility side) to a second termination (such as a second patch panel at the equipment side). The pin-out configuration of the 9-pin wire-wrap connectors is shown in FIG. 4B. In addition, the motherboard contains fifteen 72-pin edgeboard female connectors for the line access cards 15, one 96-pin DIN male connector for the test equipment card 35, and a 40-pin header connector for the test equipment interface 30. There are shorting MBB contacts between pins 1–2, 3–4, 5–6, . . . , and 47–48 on the 72-pin edge board connectors, which provide a normal-through circuit on the communication line ports when line access cards are not inserted.

Figure 5A:
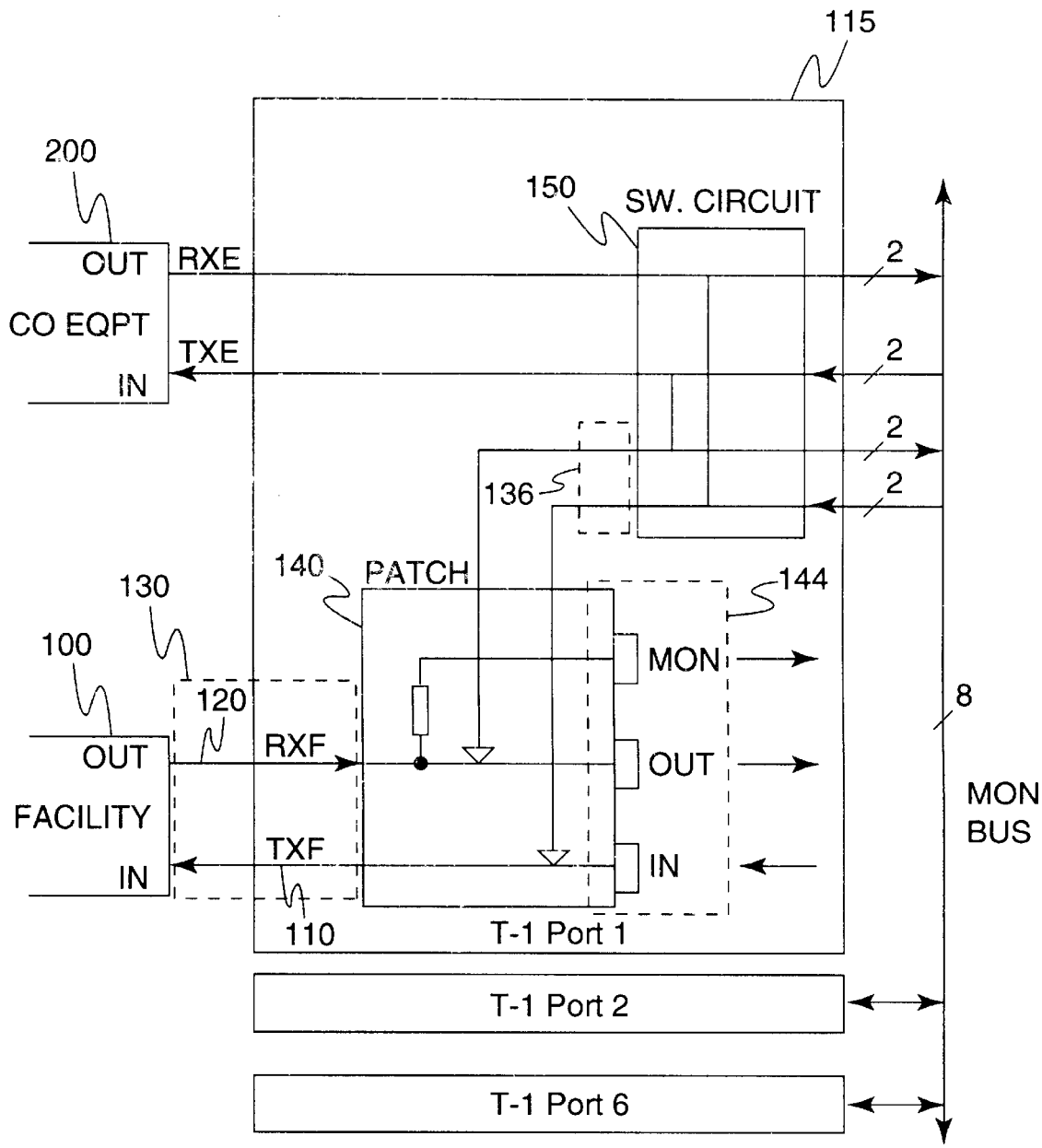
Figure 5B:
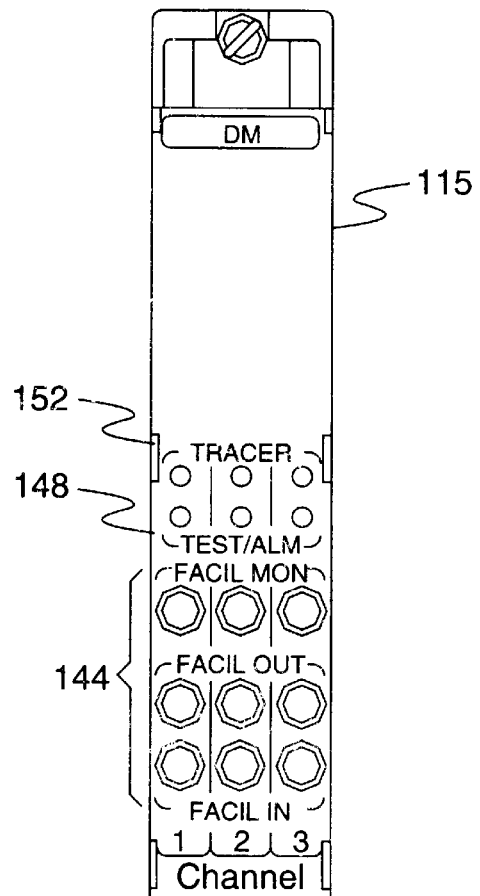

Referring now to FIG. 5A, there is shown a block diagram of a line access card 15 in accordance with an embodiment of the present invention, which provides a single patching capability for permitting cross connections, switching, testing, and monitoring, including permanent and temporary connections and terminations, respectively, to occur at a facility side 100 of a telecommunications network via transmit and receive lines, TXF 110 and RXF 120, respectively. FIG. 5B provides a front view of a line access card 15 incorporating a single patching capability. As is shown in FIG. 5B, line access card 15 includes jacks 144 to provide a user with manual and direct access to six communication lines or channels routed through line access card 15. Referring to FIG. 5B, each of the facility jacks 144, which are shown vertically aligned as MON, OUT and IN, respectively, correspond to a particular one of the six communication lines (channels). The facility jacks 144 allow patching to the facility side 100 of the test device.

As is illustrated in FIGS. 5A–5B, line access card 15, which includes a single patch circuit 140, is designed to operate within a test access system 8 by providing a patch connection 140 which permits direct access to the facility side 100 of the communication line circuit. The patch circuit 140 includes three interfaces, namely, facility interface 130, switching circuit interface 136, and jack interface 144. The facility interface 130 is connected to equipment of the facility side 100 (RXF, TXF) of the network. The switching circuit interface 136 is internally connected to the switching circuit 150 of the line access card 15. The jack interface 144 includes three jack connectors located on the front of the line access card 15 labeled IN (input), OUT (output), and MON (monitor), respectively. The IN jack provides access to the equipment to which the IN jack is terminated, and can be used to access or transmit signals into the equipment input. The OUT jack is used to monitor the output signals from the equipment to which the OUT jack is terminated. The MON jack serves a similar function as the OUT jack by monitoring communication signals, but without breaking the communication line circuit. In this manner, the MON jack allows for in-service bridging of a digital line without interfering with line operation. In the preferred embodiment, the OUT jack observes the output signals from equipment to which it is terminated by insertion of a patch cord into the OUT jack circuit.

As is also illustrated in FIG. 5B, line access card 15, which includes a single patch circuit 140, further includes two groups of LED's 148, 152 located on the front panel of line access card 15. The first group consists of six bicolor LED's 148 labeled "TEST/ALM". Each LED's 148 corresponds to a line access port. In a "test" mode, the TEST/ALM LED's 148 illuminate a particular color (e.g., green) to indicate whether a certain communication line port is being tested or not. In "alarm" mode, the TEST/ALM LED's 148 illuminate a second color (e.g., amber) to indicate an alarm condition on a certain communication line port.

The second group consists of six red LED's 152 labeled "TRACER" and are used for identification of the cross-connections between different communication line circuits. The TRACER LEDs 152 illuminate when a patch cord is inserted into its corresponding jack; all other communication line circuits that cross-connect with the initial circuit also illuminate their corresponding tracer LEDs 152. This is accomplished by connecting the tracer pins on the rear of the test access unit 8 with the tracer pins of other units 8 via wire wrap or Telco pin (64 pin) connectors.

Figure 7:
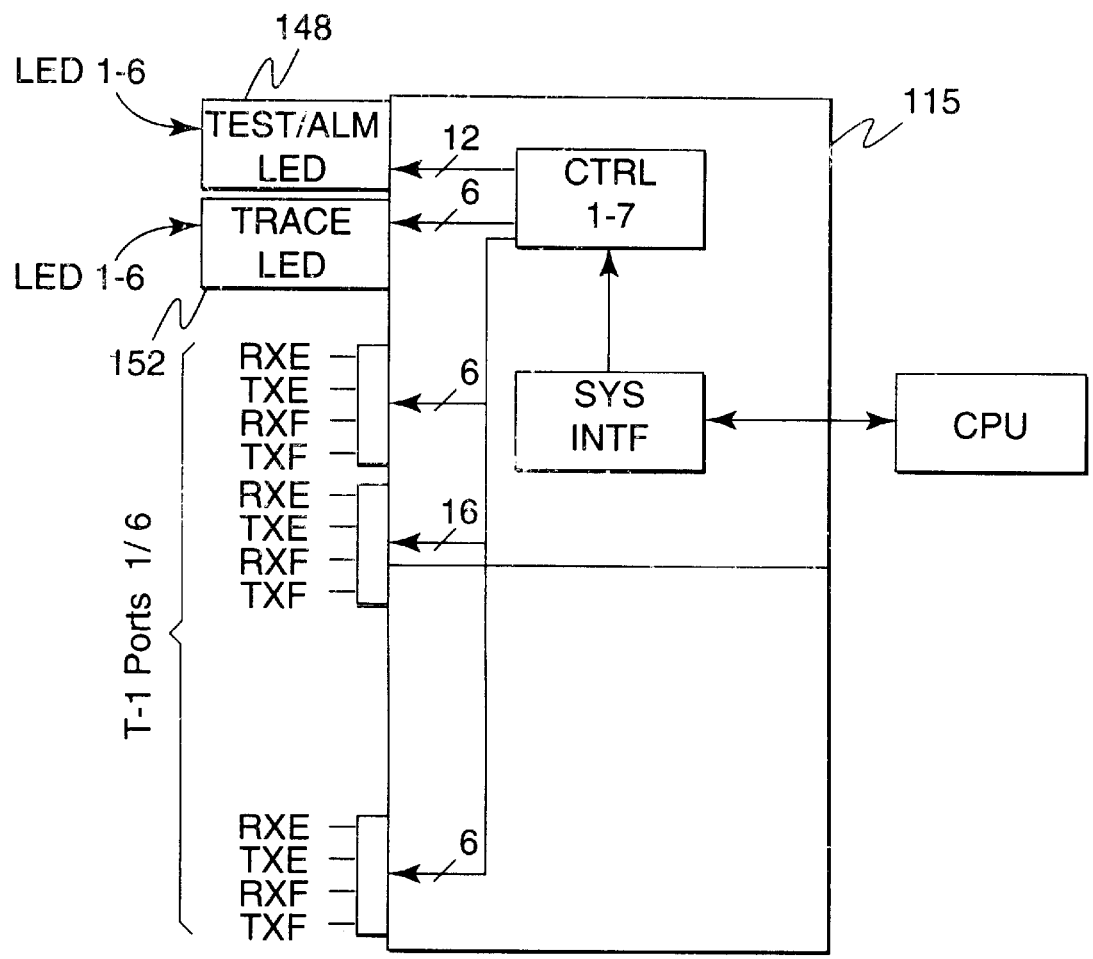
FIG. 7 is a schematic representation of various control registers and their interactions with other portions of the components of a communication line access card in accordance with an embodiment of the present invention.

In accordance with one embodiment of the present invention, a line access card 15, which includes a single patch circuit 140, comprises four different printed circuit boards (PCB). A main PCB contains 48 nonlatching 2-pole relays and six patch switches. One top mounted card contains relay drivers, control registers, status buffers, and decoders. Two front mounted LED cards contain the LED's. One bottom mounted alarm card contains alarm circuits for alarm and performance monitoring. In addition to the relay drivers, seven control registers are utilized to effect the relays of the line access card 15 by initiating or terminating connections between sides of the communication line ports and monitoring bus, as well as controlling illumination of the TEST/ALM and TRACER LEDs 148, 152, a schematic representation of which is shown in FIG. 7.

FIG. 5C shows a layout of a line access card 15 provided with a single patch circuit capability. Referring to FIG. 5C, there is shown a line access card 15 which includes three interfaces in accordance with an embodiment of the present invention. A 56-finger edge-board connector 117 provides an interface to a main motherboard. This interface 117 includes data bus, control signals, and power supply lines. A 72-pin edge board connector 119 provides connections to a communication line motherboard. This interface 119 includes one monitoring bus and six communication line port connections. Six patch connectors provide manual access to the facility side of the communication line circuits.

Figure 10A:
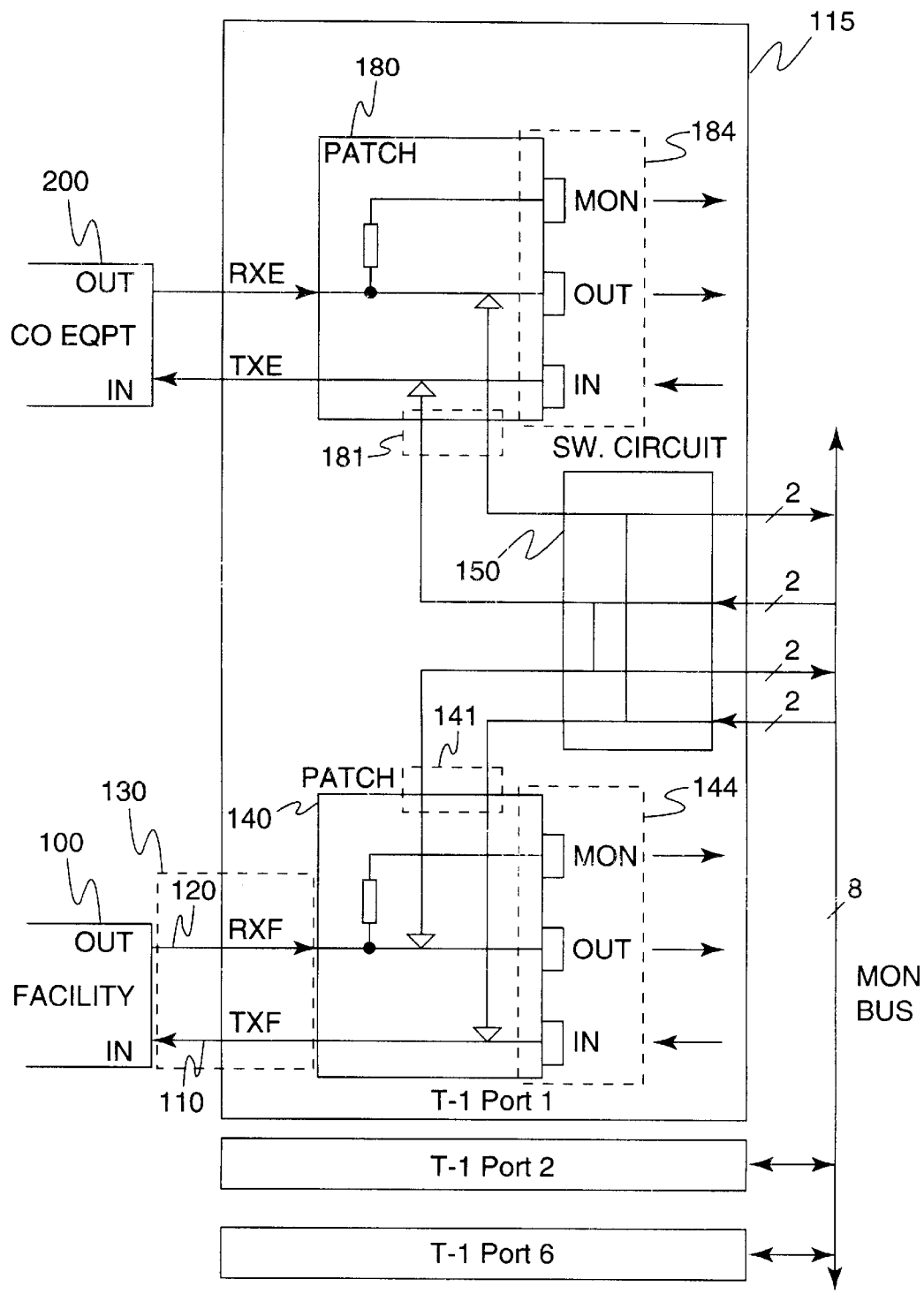
Figure 10B:
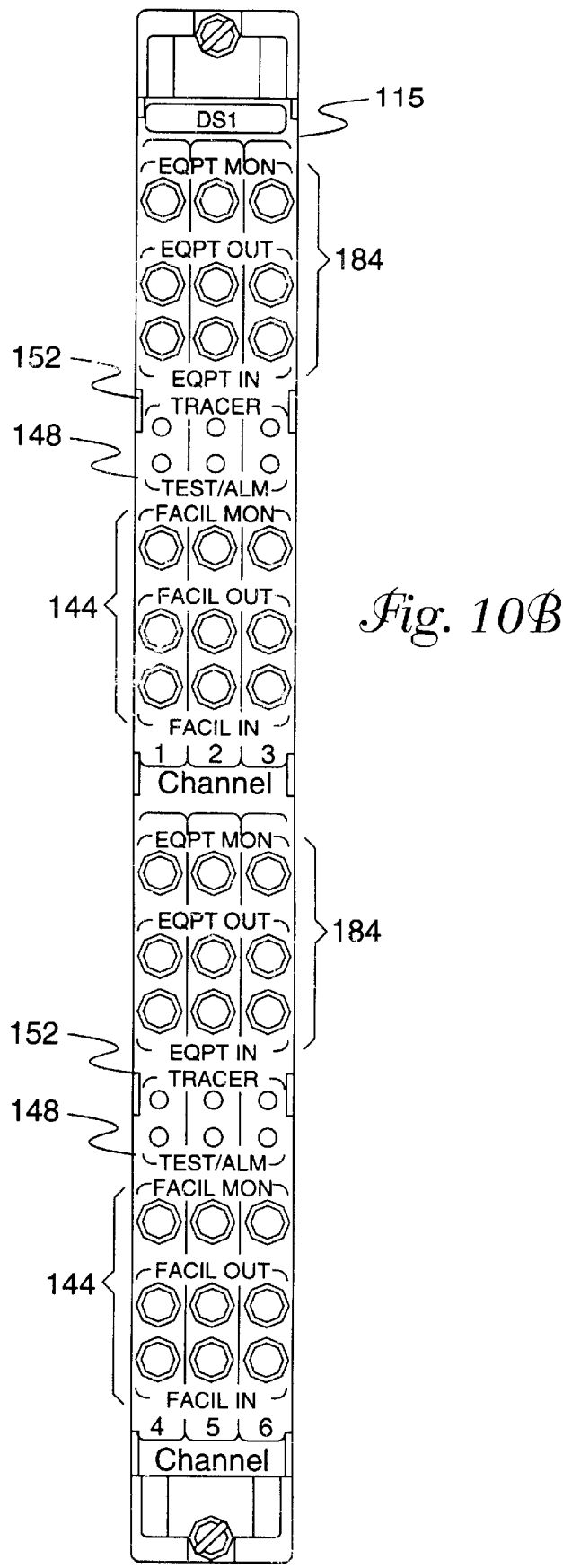

In an alternative embodiment, as is shown in FIGS. 10A and 10B, a line access card 15 may comprise a dual patch capability comprising a patch circuit 140 associated with the facility side 100 of a telecommunications network, as well as patch connection 180 connected directly to equipment side 200 of the network. In accordance with this embodiment, line access card 15 incorporates dual patch circuits 140 and 180 to permit line testing at a remote location (i.e., customer premises of the communication lines incoming from an equipment location). The group of line access cards 15 shown as LAC8–LAC15 in FIG. 1 illustrate line access cards incorporating a dual patch capability.

As previously stated, each patch circuit 140, 180 includes an equipment interface 130, 131, a switching circuit interface 141, 181, and a jack interface 144, 184, respectively. The equipment interface 130, 131 of each patch circuit 140, 180 is connected to the facility side 100 or equipment side 200 of a communication line circuit. The switching circuit interface 141, 181 of each patch circuit 140, 180 is internally connected to the switching circuit 150 of the line access card 15. The jack interface 144, 184 of each patch circuit 140, 180 includes three jack connectors located on the front of the line access card 15. The three jack connectors are labeled IN, OUT, and MON, respectively, and are associated with either the equipment or facility sides 200, 100. Each IN jack provides access to the equipment to which it is terminated. In particular, each IN jack can be used to transmit signals into the equipment (or facility) input. The OUT jack is used to monitor the output signals from the equipment to which it is terminated. The MON jack serves a similar function but without breaking the circuit connection. The MON jack thus allows for in-service bridging of a digital line without interfering with its operation. Temporary connections may be made using patch cords between jack circuits, thereby permitting restoration of failed services or providing temporary connections for cut-overs.

As with a line access card having a single patch feature, a line access card provided with a dual patching capability includes two groups of LED's 148, 152 located on the front panel of the line access card 15, as is best seen in FIG. 10B. The first group consists of six bicolor LED's 148 labeled "TEST/ALM". Each of the LED's 148 corresponds to a line access port. In a "test" mode, the TEST/ALM LED's 148 illuminate a particular color (e.g., green) to indicate whether a certain communication line port is being tested or not. In an "alarm"mode, the TEST/ALM LED's 148 illuminate a second color (e.g., amber) to indicate an alarm condition on a certain communication line port.

The second group consists of six red LED's 152 labeled "TRACER," and used for identification of cross-connections established between different communication line circuits. The TRACER LED's 152 illuminate when a patch cord is inserted into its corresponding jack; all other communication line circuits that cross-connect with the initial communication line circuit also illuminate their corresponding tracer LED's. This is accomplished by connecting the tracer pins on the rear of a test access 8 unit with the tracer pins of other test access units 8 via wire wrap or Telco pin (64 pin) connectors.

A line access card 15 incorporating dual patch circuits 140, 180 comprises four different PCB's. The main PCB includes 48 nonlatching 2-pole relays and twelve patch switches. One top mounted card contains relay drivers, control registers, status buffers, and decoders. Two front mounted LED cards contain the LED's. One bottom mounted alarm card contains alarm circuits for alarm and performance monitoring.

FIG. 10C shows the layout of a line access card 15 incorporating a dual patching capability in accordance with an embodiment of the present invention. Referring to FIG. 10C, line access card 15 includes three interfaces. A 56-finger edge-board connector 121 provides an interface to the main motherboard. This interface 121 includes data bus, control signals, and power supply lines. A 72-pin edge board connector 123 provides connections to the communication line motherboard. This interface 123 includes one monitoring bus and six communication line port connections. Twelve patch connectors provide manual access to the equipment and facility sides 200, 100 of the communication line circuits.

Figure 4D:
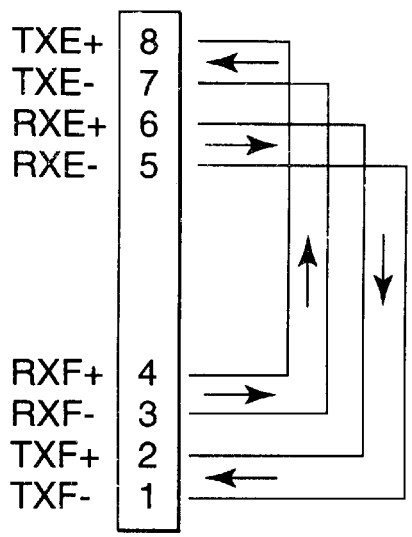
FIGS. 4D through 4M are exemplary schematic representations of switching modes and associated communication line and test ports according to the present invention.
Figure 4D:
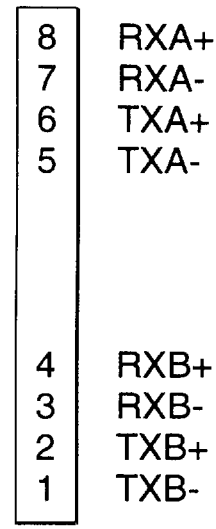
Figure 4E:
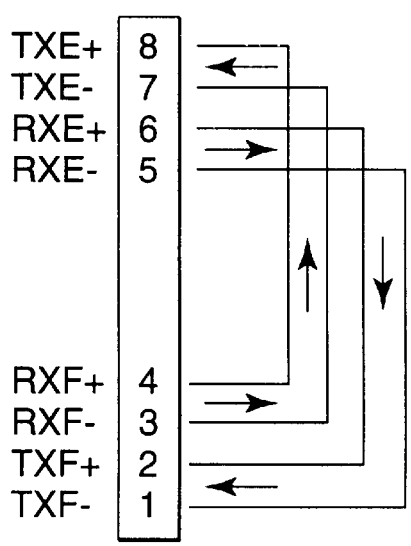
Figure 4E:
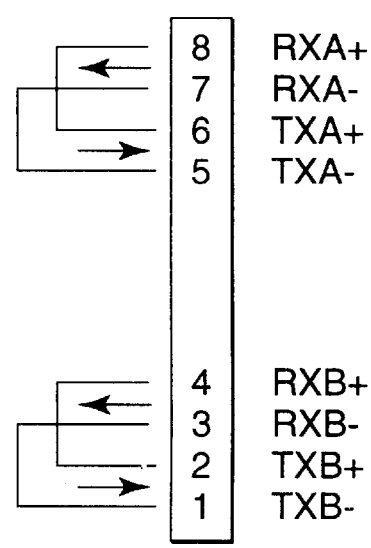
Figure 4F:
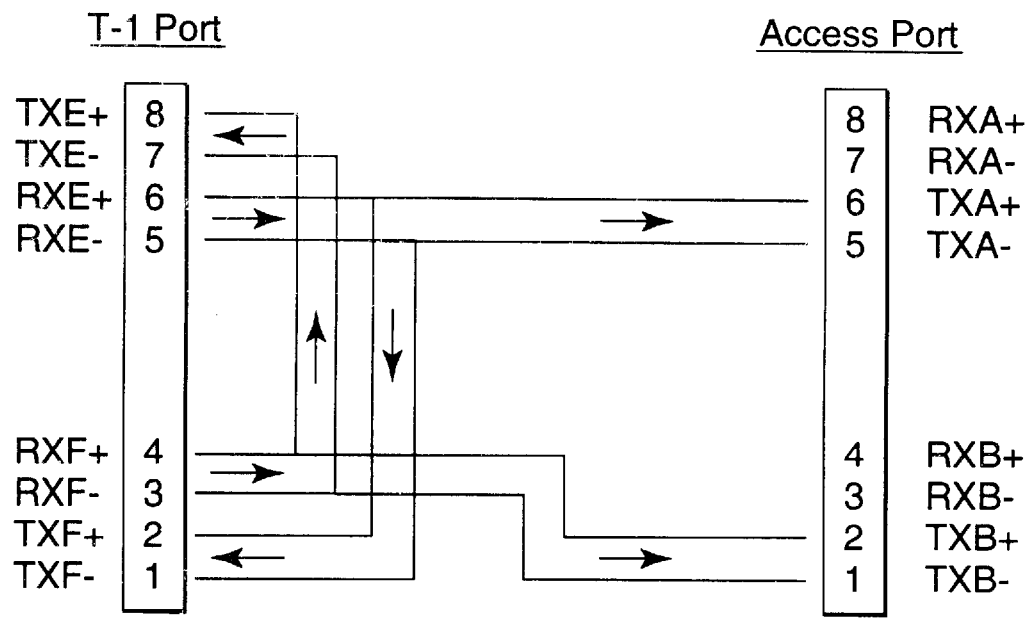
Figure 4G:
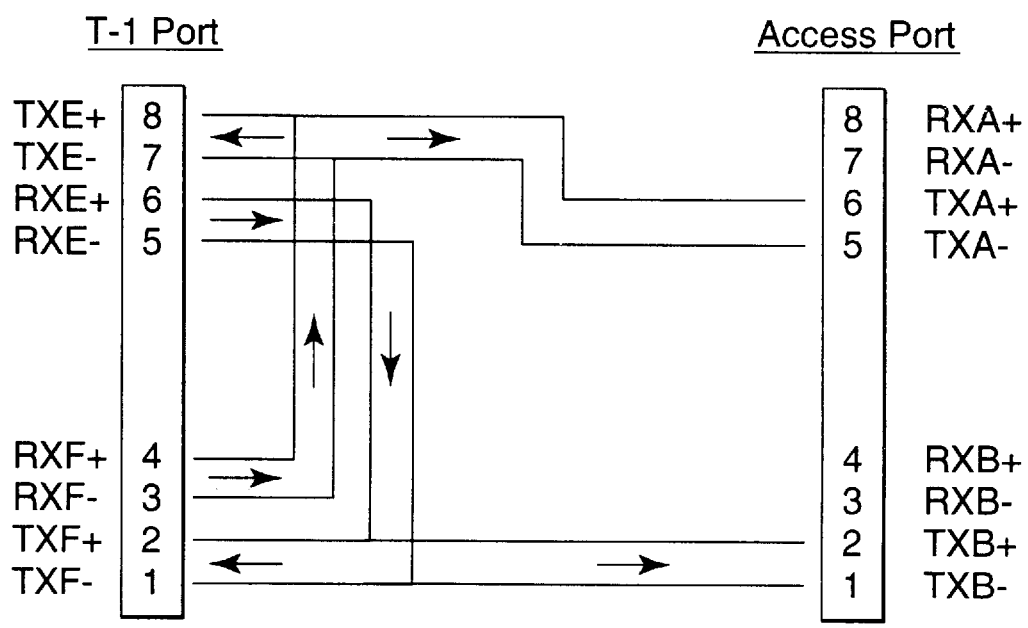
Figure 4H:
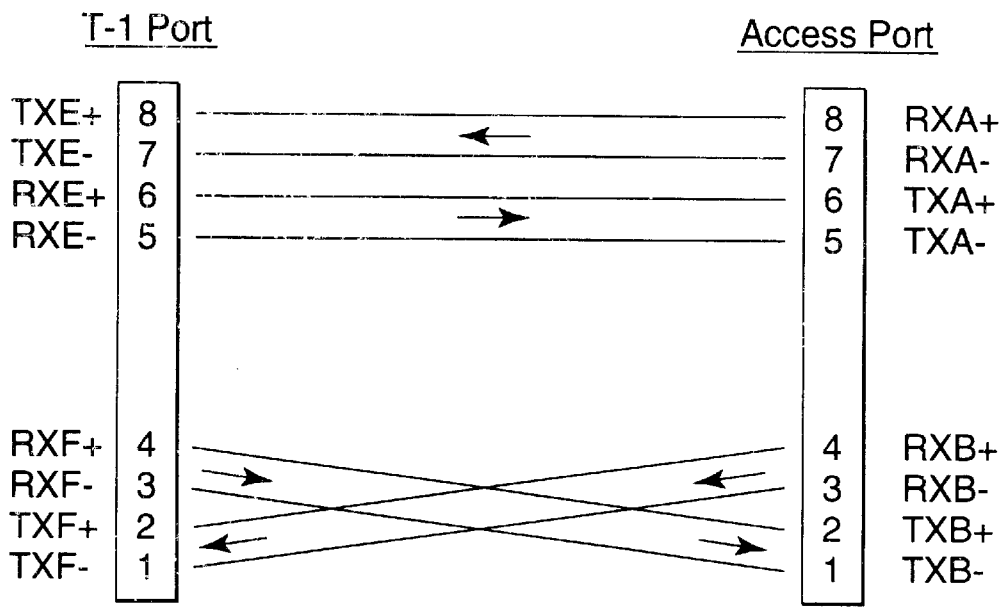
Figure 4I:
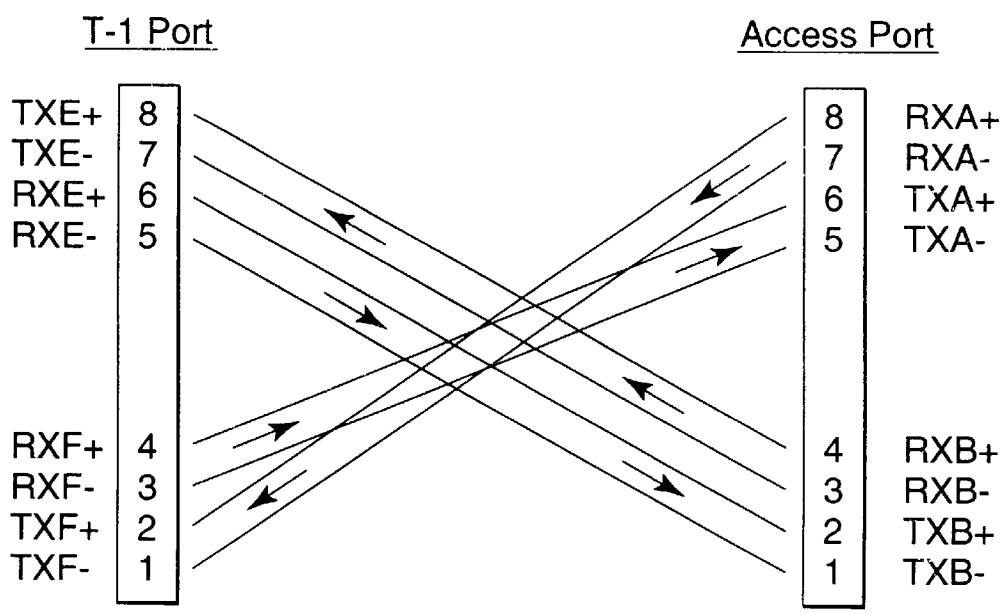
Figure 4J:
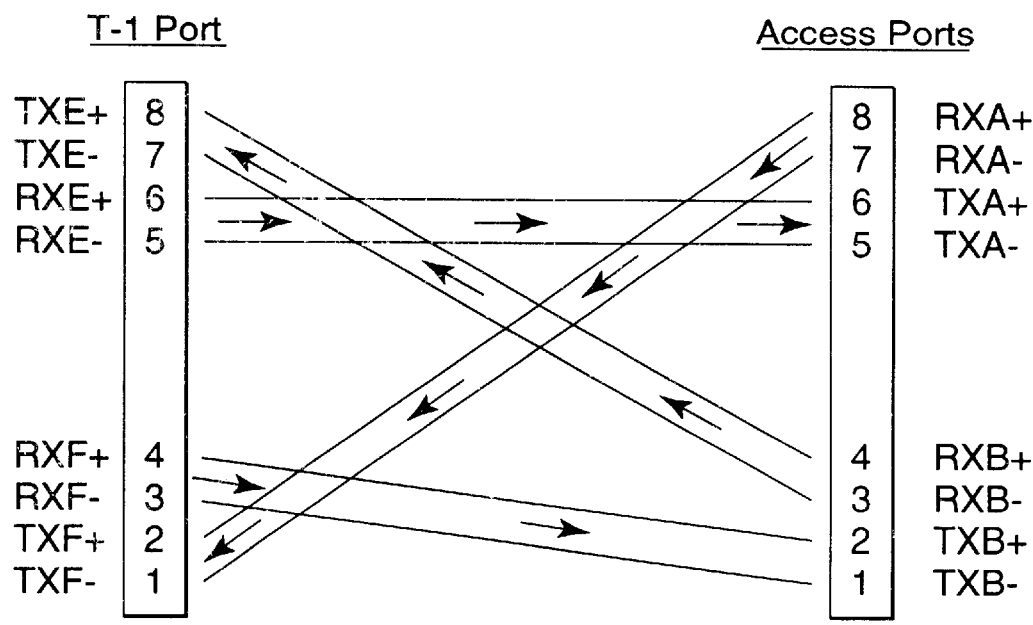
Figure 4K:
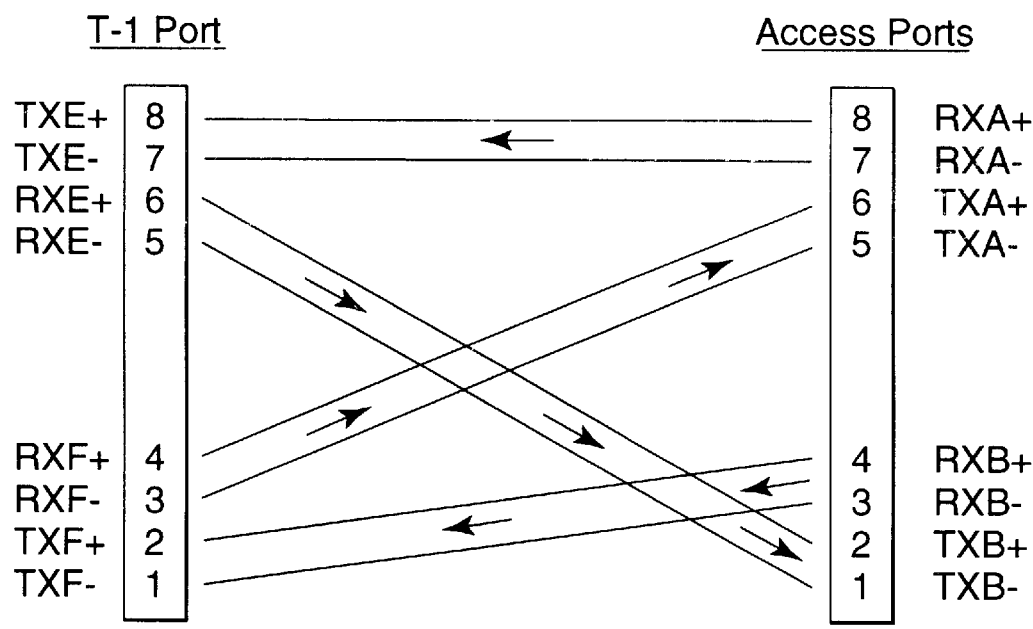
Figure 4L:
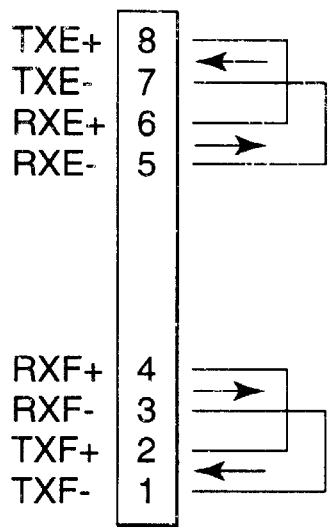
Figure 4L:
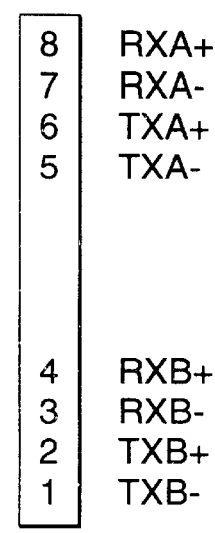
Figure 4M:
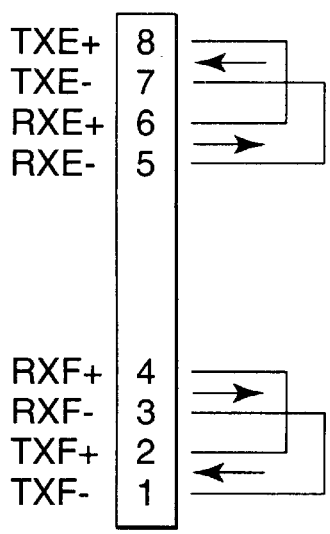
Figure 4M:
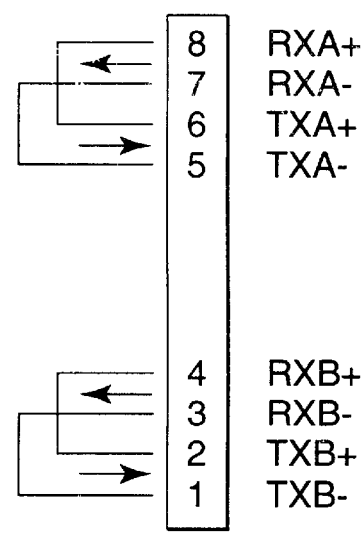
Figure 6:
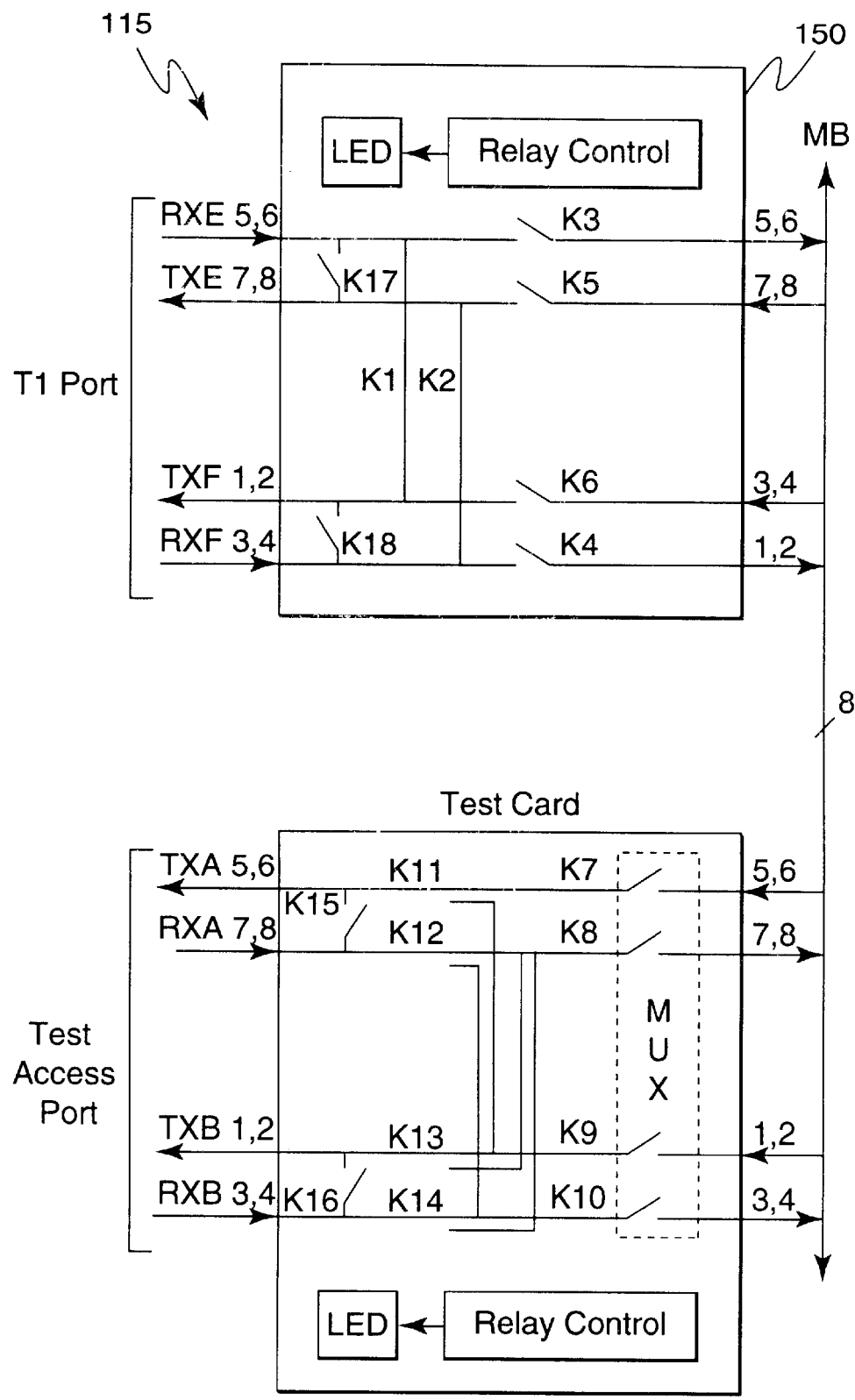
FIG. 6 shows a schematic of a communication line access card and test equipment card relays and switching circuits in accordance with an embodiment of the present invention.

Referring now to FIG. 6, there is shown a detailed block diagram of the connections of a line access card 15 which provides connectivity between a selected communication line port selected through switch circuit 150 of line access card 15 and a selected test device port (e.g., TP1–TP4). FIG. 4C provides a table of the various test access modes, and shows the correspondence between a selected mode of operation and the position of relays K1 through K18 shown in FIG. 6. FIGS. 4D–4M are examples of selected test port connections corresponding to each mode associated with a test access system embodiment of the present invention.

When a communication line port is not being tested, the port operates in a Transparent mode, i.e., the port is isolated from the monitoring bus and there is a normal-through path between "side E" and "side F" of the communication line port. Note that "side E" represents the equipment side 200 while "side F"indicates the facility side 100 of a communication line circuit connection. Data flows through the circuit connection on the equipment side 200 and facility side 100 without impediment from the test access system unit 8.

While operating in Transparent mode, the test equipment/access port is either not connected or is placed in a loopback mode. When a test device port is not in use (i.e., isolated from the monitoring bus), it may be placed in a loopback mode. This allows a testing device to send out and receive back an idle code while not testing. In a loopback AB mode of operation, data received from a test device is sent back to the test device. In particular, RXA on the test equipment port is connected to TXA on the same port. Any signals received on side A of that port are returned to the test device. Similarly, RXB on the test equipment port is connected to TXB on the associated port. Any signals received on side B of the test port are returned to the test device. In a loopback A mode of operation, data received on side A of the test equipment port is sent back to the test device, while in a loopback B mode of operation, data received on side B of the test equipment port is sent back to the test device.

In Mon EF mode there is also a normal-through path between sides E and F of the communication line port. In addition, RXE and RXF of the communication line port are connected to TXA and TXB of the test port. These configurations provide for nonintrusive monitoring on both sides of a communication line circuit. In a split EF mode of operation, sides E and F of the communication line port are split and connected to sides A and B of the test port. In this mode, a test device is able to transmit and receive test patterns to/from both sides of the communication line circuits. In a Split AB mode of operation, the communication line circuit is split and connected to the test port in a way that allows "drop and insert" testing to be performed by the testing device. Mon EFX, Split EFX, and Split ABX modes are similar, however, sides A and B of the test port are swapped.

Figure 8A:
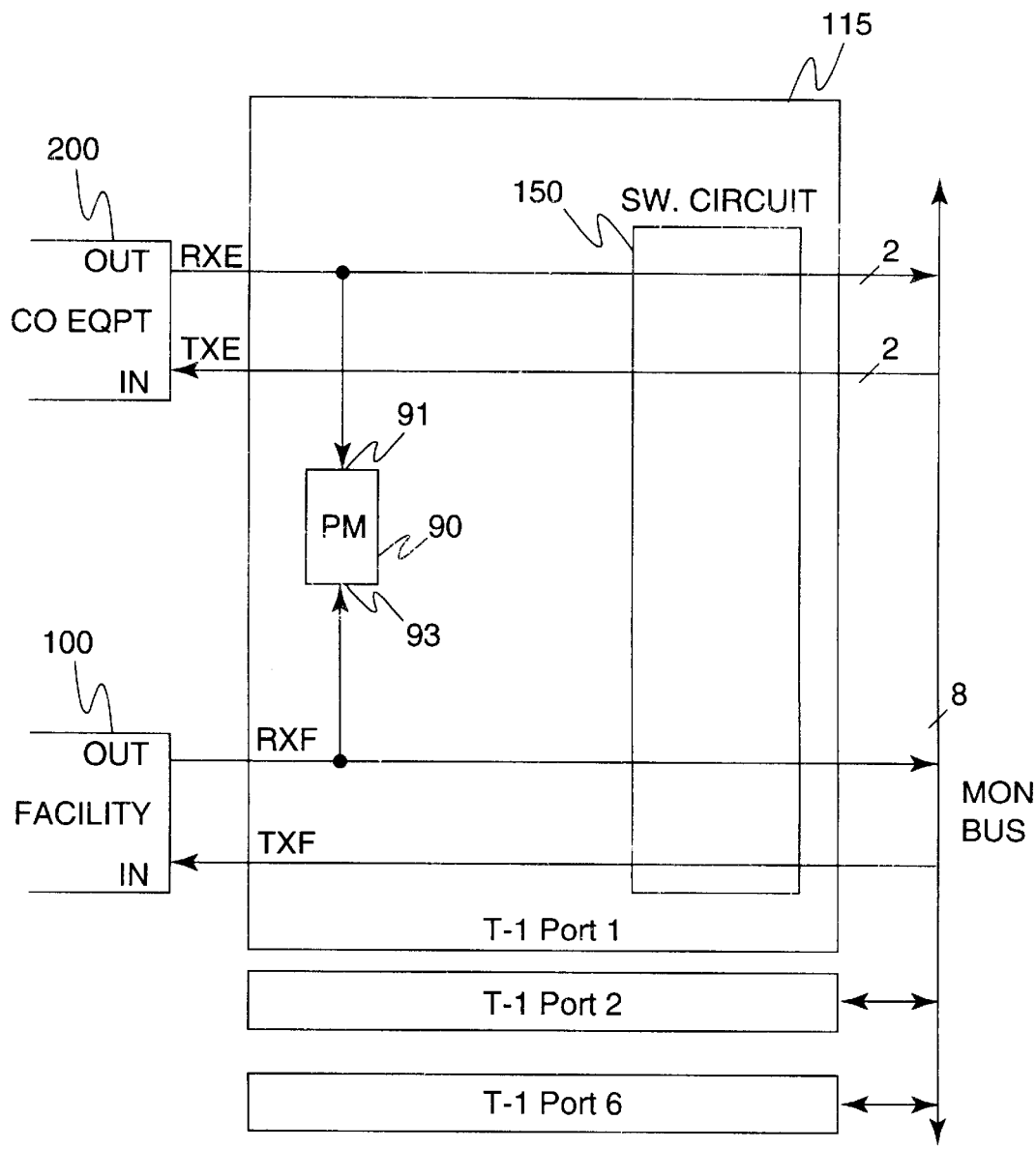
FIG. 8A is a schematic representation of a communication line access card incorporating a performance monitoring capability in accordance with an embodiment of the present invention.
Figure 8B:
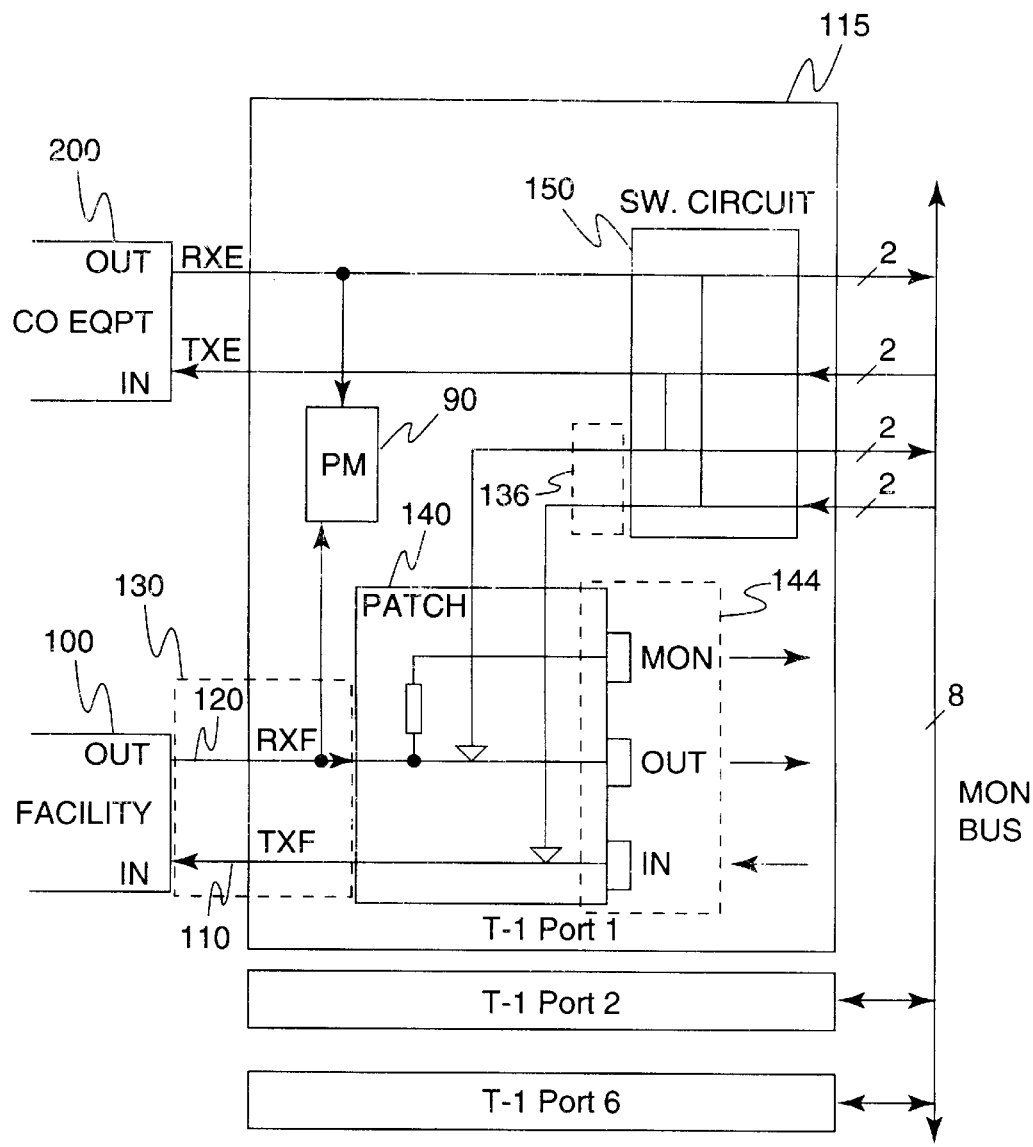
FIG. 8B is a schematic representation of a communication line access card incorporating a performance monitoring capability and single patching capability in accordance with an embodiment of the present invention.
Figure 8C:
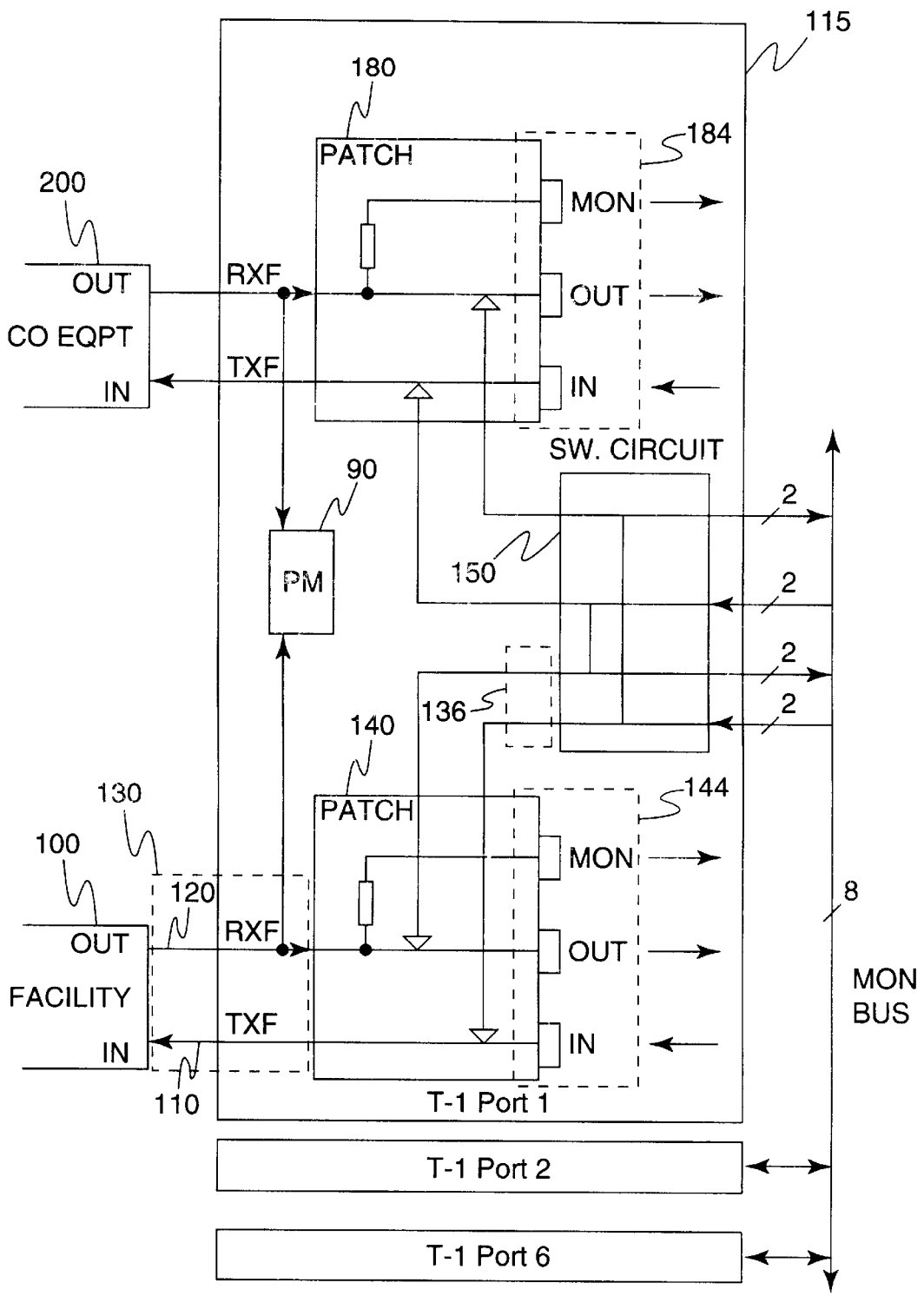
FIG. 8C is a schematic representation of a communication line access card incorporating a performance monitoring capability and dual patching capability in accordance with an embodiment of the present invention.
Figure 9:
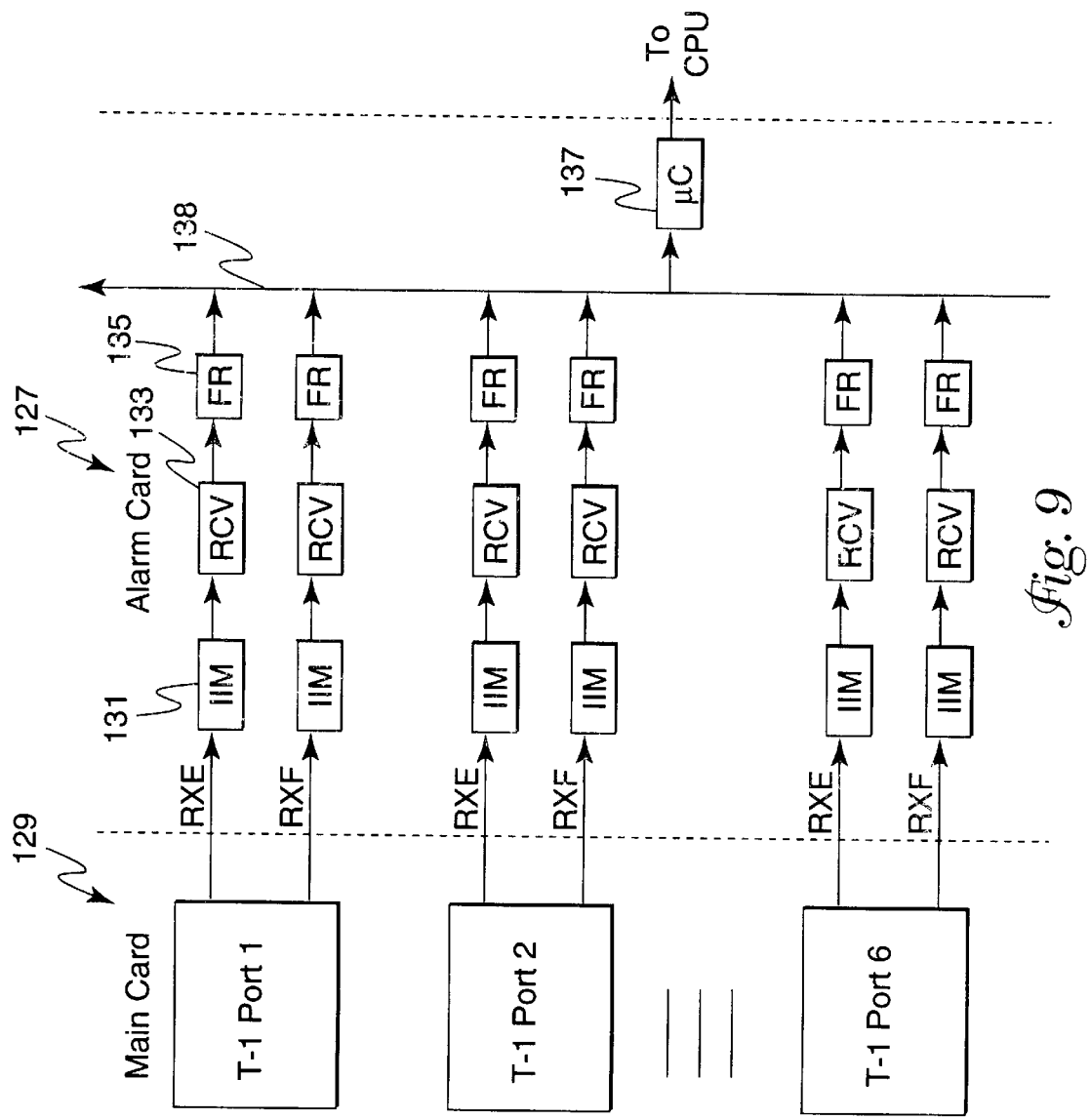
FIG. 9 shows a block diagram of various alarm features of a communication line access card in accordance with an embodiment of the present invention.

In addition to a line access card 15 of the present invention including either single or dual patch connection capabilities, a line access card 15 may also include a performance monitoring feature 90, as is shown in FIGS. 8A–8C and 9, which is capable of monitoring communication line circuits for variety of line anomalies and error information. Referring now to FIGS. 8A–8C, each line access card 15 is equipped with a monitoring function for collecting line failures from both the facility and equipment sides 100, 200 of six different communication lines. Operation of the monitoring function in accordance with an embodiment of the present invention is illustrated in FIG. 9, while FIGS. 8A, 8B, and 8C illustrate block diagram configurations for incorporation of performance monitoring into no-patch, single patch, and dual patch circuit embodiments, respectively.

Preferably, a performance monitoring function circuit 90 incorporated in a line access card 15 of the present invention represents a high impedance device, such that information signals passing through the line access card 15 are not degraded. This feature is important to allow nonintrusive monitoring of the communication line. In one embodiment, line information is constantly collected and stored in 15 minutes registers, 1 hour registers, and one day registers. Performance monitoring occurs on each of the line access ports 91, 93 simultaneously; that is, no multiplexing occurs in the preferred embodiment, which allows the performance monitor feature to accept simultaneous real time data from each of the associated lines (e.g., RXE, RXF). The information is stored in the registers and can be retrieved at any time by the management system 12. Once an alarm condition is detected, the CPU immediately sends an alarm condition signal to the management system 12, which, upon reception, presents it to the user. Each alarm event is presented to the management software via the CPU with a time of day and date stamp. Register information may be collected from the CPU at any time. If SNMP management software with paging capability is used, the management software can page the user for each alarm occurrence.

Performance parameters supported by the performance monitoring and alarm functions of a test access system 8 of the present invention include near-end line performance parameters, and near-end path performance parameters and alarms. Performance monitoring and alarm features are intended to monitor and detect both line and path anomalies and defects. Line anomalies include a bipolar violation (BPV), which occurs as a non-zero pulse of the same polarity of the previous pulse, and excessive zeros (EXZ), which includes any zero string length greater than 7 contiguous zeroes (B8ZS), as well as any zero string length greater than 15 contiguous zeroes (AMI).

Path anomalies include CRC-6 errors and frame bit errors (FE). CRC-6 errors are detected when a received CRC-6 code does not match the CRC-6 code calculated from the received data. Frame bit errors are bit errors occurring in the received frame bit pattern. Line defects include loss of signal (LOS), while path defects comprise out-of-frame (OOF), severely errored frame (SEF), and alarm indication signals (AIS). Severely errored frames include the occurrence of two or more frame bit errors within a window. An AIS event indicates the occurrence of an unframed signal having a "one's density" of at least 99.9% present for at least three seconds. This is indicative of an upstream transmission interruption.

For near-end line failures, an LOS occurs when the LOS defect persists for 2.5 seconds, ±0.5 second. Near-end path failures include and AIS and LOS, while far-end path failures include a remote alarm indication (RAI), which indicates a signal transmitted in the outgoing direction when equipment determines that it has lost the incoming signal. Other indicators include the near-end path failure count (count of near-end path failures) and far-end path failure count. Near-end line performance parameters include code violation-line (CV-L), errored second line (ES-L), and severely errored second-line (SES-L). Near-end path performance parameters include code violation-path (CV-P), errored second path (ES-P), severely erred second-path (SES-P), SEF/AIS second path (SAS-P), and unavailable second path (UAS-P). Alarms supported include red alarm, blue alarm, yellow alarm, corresponding to loss of signal (LOS), alarm indication signal (AIS) and remote alarm indication (RAI), respectively.

FIG. 9 shows a more detailed block diagram of the line access card and performance monitoring and alarm functions associated with a test access system embodiment of the present invention. The alarm function is provided as an attachment to the line access card 15, and provides performance monitoring on both sides of a communication line circuit supported by the line access card 15. Alarm card 127 includes 12 identical channels which monitor both sides (E and F) of six communication line circuits. Each channel comprises an isolation and impedance matching circuit (IIM) 131, receiver (RCV) 133, and framer (FR) 135. The isolation and impedance matching circuit 131 provides surge protection, attenuation, isolation, and impedance matching required for monitoring communication line circuit connections. Receiver 133 performs data and timing recovery, and uses peak detection and variable thresholds for reducing impulse noise. The framers 135 provide for alarm condition detection, including:

Blue Alarm (AIS): when over a 3 ms window, five or less zeros are received;

Yellow Alarm: when bit 2 of 256 consecutive channels is set to zero for at least 254 occurrences; or when the $12_{th}$ framing bit is set to one or two consecutive occurrences; or when 16 consecutive patterns of 00FF appear in the Facility Data Link (FDL);

Red Alarm (RCL): when 192 consecutive zeros are received.

In addition, the framers 135 include large counters for bipolar violations (BPV), line code violations (LCV), excessive zeros (EXZ), CRC-6 code violations, path code violations (PCV), frame bit error (FBE), and multi-frame out of synchronization (MOS) events.

It is noted that in the preferred embodiment, each receiver 133 is part of a quad fully-integrated PCM receiver. As was previously mentioned, the receivers 133 perform data and timing recovery, and use peak detection and a variable threshold to reduce impulse noise. The clock for receivers 133 may be provided by an external 1.544 MHZ quartz crystal oscillator. Further, each framer 135 is part of a quad fully-integrated framer. All four framers 135 are fully independent. The receive side of each framer 135 performs alarm detection as previously described.

Microcontroller 137 shown in FIG. 9 is preferably a CMOS fully-static 8-bit device with 192 bytes of RAM and 22 I/O ports (such as Microchip Technology P/N PIC 16C63) having a synchronous serial port configured as a 3-wire Serial Peripheral Interface (SPI) to communicate with the system CPU (e.g., MC68302) via a system Serial Bus (SB). The Microcontroller 137 forms a local 8-bit multiplexed address/data bus 138 which is used for communication with the framers 135. The clock for the Microcontroller 137 may be provided by an external 3.6864 MHZ quartz crystal oscillator.

A test access system according to a further embodiment of the present invention includes a software-based management and user interface coupled to the CPU for remotely accessing and controlling the operation of the test access system. The management software permits a user who is located remotely from the test access system 8 to execute a variety of functions, including mode changes, diagnostic testing, and monitoring. The test access system 8 is operable to support several management options, including SNMP with Optional Windows Based GUI (graphical user interface) Manager and TL1. The SNMP can be compiled into any SNMP compliant management software. Traps can be set for the various alarms, and, upon detection, are sent to the SNMP management software.

GUI application software then collects the alarm information in a database, and provides reports and statistical graphs for a variety of alarms. By way of example, whenever an alarm message is received, the appropriate site icon turns red, and an audio alarm sounds to alert the user monitoring the terminal. Preferably, TL1 language is used for providing notification of alarm events. However, other languages may be employed as necessary depending on the particular application and requirements of the system.

A software interface receives signals from the CPU, such as CPU 98 shown in FIG. 7, indicative of the status of a particular communication line, and displays such status to the user via the display screen of a user interface 95. Similarly, a user located at the display screen may initiate a change in status or perform a function, such as selection of a particular tracer LED at a console remote from the test access system 8. Such a feature finds particular use when attempting to identify a particular communication line among multiple rack units. The particular line may be identified by blinking the tracer light associated with that connection. The signal to initiate the blinking tracer is sent over the software interface to the device CPU 98 causing the appropriate tracer LED corresponding to the selected line access port to be illuminated. Such a "manual" tracer feature, which allows a user at a remote location to directly pulse a particular LED to indicate to a technician at the site of a particular system the location of a particular line for examination, is extremely advantageous when multiple lines and multiple patch panels co-exist in a common facility. This manual tracer feature is provided in addition to the tracer feature activated upon insertion of a jack into a particular line access card 15. As one can ascertain, such remote access and monitoring significantly decreases the time necessary for a field operator to both diagnose and locate communication line connection problems, as well as to test corrective actions.

Although preferred system embodiments of the present invention have been disclosed for illustrative purposes, those skilled in the art will appreciate that many additions, modifications, and substitutions are possible without departing from the scope of the present invention. For instance, a line access card incorporating a single or dual patching capability, as well as the performance monitoring feature, may also be incorporated into various other test access devices for T1–T4 transmission lines, such as the HADAX 2005 T-3 Access System, aspects of which are described in copending and commonly assigned patent application No. 09/XXX,XXX (Jacobson, et al.; Attorney Docket No. 245.0003 0101), filed on Dec. 23, 1998 and entitled "TEST ACCESS SYSTEM AND METHOD FOR DIGITAL COMMUNICATION NETWORKS," the content of which is incorporated herein by reference in its entirety. Accordingly, all such variations or modification of the invention described hereinabove are intended to be included within the scope of the invention.

What is claimed is:

1. A system for accessing a plurality of communication lines by one or more testing devices, each of the plurality of communications lines coupled through the system and having a first termination at a first telecommunications termination site and a second termination at a second telecommunications termination site, the system comprising:

a plurality of line access devices, each of the line access devices coupled to at least one of the communication lines terminating at the first telecommunications termination site and at least one of the communication lines terminating at the second telecommunications termination site;

a test device interface;

signal direction circuitry;

a communications device that facilitates remote access to the system by a remote processing unit; and a control device, the control device, in response to a control signal received from the remote processing unit, controlling the signal direction circuitry to couple a selected communication line to a selected testing device coupled to the test device interface.

2. The system of claim 1, wherein the signal direction circuitry comprises a patch circuit provided in each of the line access devices, each of the patch circuits providing local access to a communication line coupled to its corresponding line access device.

3. The system of claim 1, wherein the signal direction circuitry comprises a patch circuit provided in each of the line access devices, each of the patch circuits comprising an input (IN) port, an output (OUT) port, and a monitor (MON) port.

4. The system of claim 3, wherein each of the input (IN) port, output (OUT) port, and monitor (MON) port comprises a jack-type connector.

5. The system of claim 1, wherein the signal direction circuitry comprises a patch circuit provided in each of the line access devices, each of the patch circuits comprising an input (IN) port, an output (OUT) port, a monitor (MON) port, and one or more visual indicators, a visual indicator associated with the monitor (MON) port of each of a pair of cross-connected line access devices illuminating in response to insertion of a patch connector into at least one of the respective monitor (MON) ports.

6. The system of claim 1, wherein the signal direction circuitry comprises a patch circuit and a switch circuit provided in each of the line access devices, a respective pair of patch and switch circuits cooperating to provide connectivity between the selected testing device and equipment coupled to the selected communication line.

7. The system of claim 1, wherein the signal direction circuitry further comprises a bus coupled to the test device interface, the signal direction circuitry, in response to the control signal, coupling a selected one of the plurality of line access devices to the bus and to the selected test device via the test device interface.

8. The system of claim 1, wherein the signal direction circuitry further comprises a bus, the signal direction circuitry, in response to the control signal, coupling a first selected one of the plurality of line access devices and a second selected one of the plurality of line access devices to the bus so as to establish a cross connection between the first and second selected line access devices.

9. The system of claim 8, wherein the signal direction circuitry further comprises a patch circuit comprising an input (IN) port and an output (OUT) port for manually establishing a cross connection between the first and second selected line access devices.

10. The system of claim 1, wherein the communications device provides transmission of configuration or status information between the system and the remote processing unit.

11. The system of claim 1, wherein the communication lines comprise high speed digital transmission lines.

12. The system of claim 1, wherein the communication lines comprise high speed digital transmission lines characterized by transmission rates on the order of tens or hundreds of megabytes per second (Mbps).

13. The system of claim 1, wherein the system defines all or a portion of a digital signal cross-connect (DSX) system.

14. The system of claim 1, wherein each of the line access devices is coupled to a plurality of communication lines terminating at the first telecommunications termination site and a plurality of communication lines terminating at the second telecommunications termination site.

15. The system of claim 1, further comprising a chassis, wherein each of the line access devices, signal direction circuitry, test device interface, control device, and communications device are removably insertable into one of a plurality of slots provided in the chassis.

16. The system of claim 1, further comprising a first chassis and a second chassis, wherein a first group of line access devices are provided in the first chassis and a second group of line access devices are provided in the second chassis, the signal direction circuitry providing shared access to one or more test devices by any of the line access devices defining the first and second groups of line access devices.

17. The system of claim 1, wherein the test device interface comprises one or more visual indicators for communicating operating status information.

18. The system of claim 1, wherein each of the line access devices comprises one or more visual indicators for communicating operating status information.

19. The system of claim 1, wherein each of the line access devices comprises one or more visual indicators, the visual indicators selectively activatable in response to control signals received from the remote processing unit.

20. The system of claim 1, wherein:
the test device interface comprises a test card, the test card comprising one or more indicators for communicating an operating status of the test device interface; and
each of the line access devices comprises a line access card, the line access cards comprising one or more light emitting devices for indicating an operating status of the line access devices.

21. A system for accessing a plurality of communication lines by one or more testing devices, each of the plurality of communications lines coupled through the system and having a first termination at a first telecommunications termination site and a second termination at a second telecommunications termination site, the system comprising:
a plurality of line access devices, each of the line access devices coupled to at least one of the communication lines terminating at the first telecommunications termination site and at least one of the communication lines terminating at the second telecommunications termination site;
a test device interface;
signal direction circuitry;
a communications device that facilitates remote access to the system by a remote processing unit;
a performance monitoring device coupled to each of the line access devices, the performance monitoring device monitoring communication line performance; and
a control device, the control device, in response to control signals received from the remote processing unit, controlling the signal direction circuitry to couple a selected communication line to a selected testing device coupled to the test device interface and cooperating with the performance monitoring device to transmit performance data to the remote processing unit.

22. The system of claim 21, wherein the signal direction circuitry directs an information signal transmitted over the selected communication line terminating at the first telecommunications termination site to the selected testing device and to a second selected communication line terminating at the second telecommunications termination site.

23. The system of claim 22, wherein the signal direction circuitry directs the information signal to the selected testing device and the second selected communication line without interrupting transmission of the information signal to the second selected communication line.

24. The system of claim 21, wherein the performance monitoring device detects line and path anomalies associated with communication line performance.

25. The system of claim 21, wherein the performance monitoring device comprises a memory that stores performance data indicative of communication line performance.

26. The system of claim 21, wherein the performance monitoring device comprises a memory that stores performance data indicative of communication line performance, the performance data transmitted to the remote processing unit in response to expiration of a pre-established time duration, an alarm condition, or a control signal transmitted from the remote processing unit.

27. The system of claim 21, wherein the performance monitoring device comprises isolation and impedance matching circuitry to facilitate monitoring of communication line performance.

28. The system of claim 21, wherein the performance monitoring device comprises an alarm circuit for detecting anomalous communication line performance.

29. The system of claim 21, wherein the performance monitoring device comprises a receiver circuit that performs one or both of data recovery and timing recovery.

30. The system of claim 21, wherein each of the line access devices comprises a performance monitoring device.

31. The system of claim 21, further comprising a user interface coupled to one or both of the control device and remote processing unit.

32. The system of claim 21, further comprising a graphical user interface coupled to one or both of the control device and remote processing unit, the graphical user interface communicating operational status and alarm information to a user.

33. The system of claim 21, wherein the communication lines comprise high speed digital transmission lines.

34. A method of accessing a plurality of communication lines by one or more testing devices, each of the plurality of communications lines coupled through an accessing system and having a first termination at a first telecommunications termination site and a second termination at a second telecommunications termination site, the method comprising:

selecting one of the plurality of communication lines terminating at the first or second telecommunications termination sites;

selecting one of a plurality of testing device interface outputs;

receiving control signals from a remote processing unit;

establishing, in response to a first control signal, a signal path between the selected communication line and the selected testing device interface output; and establishing, in response to a second control signal, a signal path between the selected communication line and a second selected communication line terminating at the first or second telecommunications termination sites.

35. The method of claim 34, further comprising manually establishing a signal path between the selected communication line and a third selected communication line.

36. The method of claim 34, further comprising visually indicating establishment of electrical continuity between the selected communication line and the second selected communication line.

37. The method of claim 34, further comprising illuminating one or more visual indicators associated with a corresponding one or more selected communication lines in response to an illumination control signal received from the remote processing unit.

38. The method of claim 34, further comprising monitoring performance of each of the plurality of communication lines.

39. The method of claim 34, further comprising monitoring performance of each of the plurality of communication lines substantially simultaneously.

40. The method of claim 34, further comprising:

detecting anomalous communication line performance; and communicating an error indication in response to detecting a communication line anomaly.

41. The method of claim 40, wherein communicating the error indication further comprises communicating the error indication to one or both of a local or remote user interface.

42. The method of claim 34, wherein the method is performed in a digital signal cross-connect (DSX) environment.

43. The method of claim 34, wherein the communication lines comprises high speed digital communication lines.

44. The method of claim 34, wherein the communication lines comprise high speed digital transmission lines characterized by transmission rates on the order of tens or hundreds of megabytes per second (Mbps).

* * * * *